(12) United States Patent
Nakamura et al.

(10) Patent No.: US 8,826,595 B2
(45) Date of Patent: Sep. 9, 2014

(54) WINDOW REGULATOR IN WHICH A MEANS FOR FIXING AND SUPPORTING A DRIVE MOTOR, A MEANS FOR FIXING AND SUPPORTING A GUIDE RAIL, A MEANS FOR HOLDING AN ORBIT OF AN ELONGATE PUSH-PULL MEMBER IN AN IDLE PATH, AND A MEANS FOR MOUNTING ON AN OBJECT ARE INTEGRALLY FORMED

(75) Inventors: Teruyuki Nakamura, Sakura (JP); Tsutomu Iwaya, Sakura (JP); Toshiyuki Kanai, Sakura (JP); So Takakura, Sakura (JP)

(73) Assignee: Yachiyo Industry Co., Ltd., Sayama-Shi (JP)

( * ) Notice: Subject to any disclaimer, the term of this patent is extended or adjusted under 35 U.S.C. 154(b) by 0 days.

(21) Appl. No.: 13/882,234

(22) PCT Filed: Sep. 27, 2011

(86) PCT No.: PCT/JP2011/072051
§ 371 (c)(1),
(2), (4) Date: Apr. 29, 2013

(87) PCT Pub. No.: WO2012/063569
PCT Pub. Date: May 18, 2012

(65) Prior Publication Data
US 2013/0205669 A1     Aug. 15, 2013

(30) Foreign Application Priority Data

| | | |
|---|---|---|
| Nov. 8, 2010 | (JP) | 2010-249851 |
| Aug. 1, 2011 | (JP) | 2011-168402 |
| Aug. 1, 2011 | (JP) | 2011-168404 |
| Aug. 1, 2011 | (JP) | 2011-168405 |

(51) Int. Cl.
E05F 11/38    (2006.01)
E05F 11/42    (2006.01)
B60J 1/17     (2006.01)
E05F 15/16    (2006.01)

(52) U.S. Cl.
CPC ............... *B60J 1/17* (2013.01); *E05F 11/426* (2013.01); *E05Y 2900/55* (2013.01); *E05F 15/1669* (2013.01)

USPC ........... 49/350; 49/348; 49/349; 49/352; 49/374; 49/375

(58) Field of Classification Search
CPC .... E05F 11/423; E05F 11/426; E05F 15/1669
USPC ............ 49/348–350, 352, 372, 374, 375, 502
See application file for complete search history.

(56) References Cited

U.S. PATENT DOCUMENTS 3,831,320 A * 8/1974 Dauernheim et al. .......... 49/352
4,004,371 A * 1/1977 Podolan et al. ................. 49/352

(Continued)

FOREIGN PATENT DOCUMENTS

| JP | 57-77778 | * 5/1982 |
|---|---|---|
| JP | 1982-165577 | 10/1982 |

(Continued)

OTHER PUBLICATIONS

Japanese Office Action dated Jun. 25, 2013, 2 pages.

(Continued)

*Primary Examiner* — Katherine Mitchell
*Assistant Examiner* — Marcus Menezes
(74) *Attorney, Agent, or Firm* — Rankin, Hill & Clark LLP

(57) ABSTRACT

A window regulator including a drive gear connected to a drive motor, an elongate push-pull member which is open ended and flexible, meshes with the drive gear, and can be pushed and pulled by bidirectional rotations of the drive gear, a carrier which is connected with one end of the elongate push-pull member and is also connected with window glass, and a guide rail which guides the elongate push-pull member and the carrier in a drive path. The window regulator further includes a frame in which a means for fixing and supporting the drive motor, a means for fixing and supporting the guide rail, a means for holding an orbit of the elongate push-pull member in an idle path, and a means for mounting on an object are integrally formed.

12 Claims, 18 Drawing Sheets

(56) References Cited

U.S. PATENT DOCUMENTS

| | | | |
|---|---|---|---|
| 4,168,595 A * | 9/1979 | Pickles et al. | 49/352 |
| 4,253,277 A * | 3/1981 | Campbell et al. | 49/352 |
| 4,400,913 A * | 8/1983 | Krantz et al. | 49/352 |
| 4,672,771 A * | 6/1987 | Lam et al. | 49/352 |
| 4,685,248 A * | 8/1987 | Hammond | 49/352 |
| 5,086,589 A * | 2/1992 | dibenedetto | 49/502 |
| 5,461,826 A * | 10/1995 | Heckel et al. | 49/28 |
| 2007/0193119 A1* | 8/2007 | Hoffman | 49/352 |

FOREIGN PATENT DOCUMENTS

| | | |
|---|---|---|
| JP | 57-187484 | 11/1982 |
| JP | 59-52078 | 3/1984 |
| JP | 60-68284 | 5/1985 |
| JP | 1985-135471 U | 9/1985 |
| JP | 3215928 | 8/2001 |

OTHER PUBLICATIONS

Japanese Office Action dated Jun. 3, 2014, 2 pages.

* cited by examiner

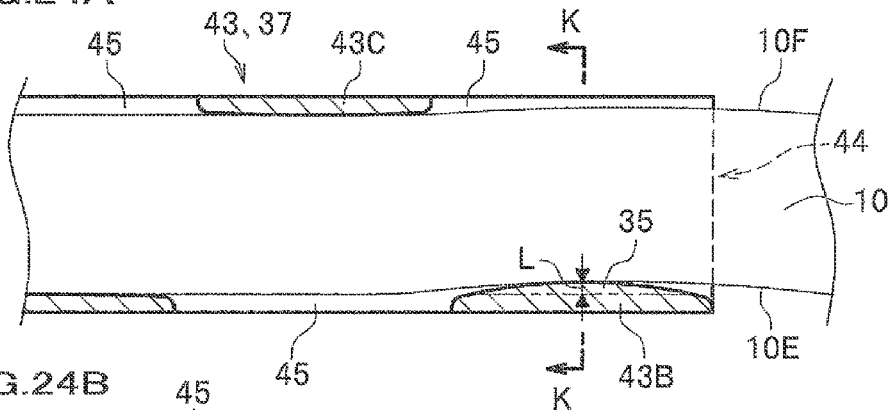
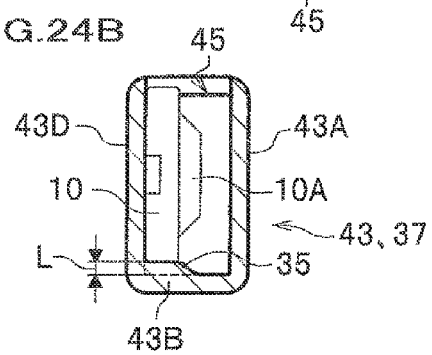
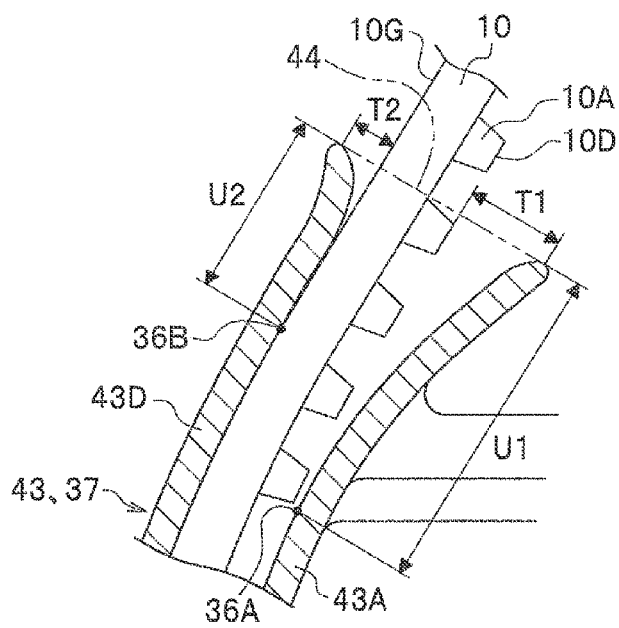

WINDOW REGULATOR IN WHICH A MEANS FOR FIXING AND SUPPORTING A DRIVE MOTOR, A MEANS FOR FIXING AND SUPPORTING A GUIDE RAIL, A MEANS FOR HOLDING AN ORBIT OF AN ELONGATE PUSH-PULL MEMBER IN AN IDLE PATH, AND A MEANS FOR MOUNTING ON AN OBJECT ARE INTEGRALLY FORMED

CROSS REFERENCE TO RELATED APPLICATIONS

This application claims the foreign priority benefit under Title 35, United States Code, 119 (a)-(d) of Japanese Patent Application No. 2010-249851, filed on Nov. 8, 2010 in the Japan Patent Office, the disclosure of which is herein incorporated by reference in its entirety.

TECHNICAL FIELD

The present invention relates to a window regulator which causes a pane of window glass of an automobile to move up and down.

BACKGROUND ART

Patent Literature 1 discloses an example of a conventional window regulator which includes a drive gear, an open-ended flexible elongate push-pull member, a carrier, and a guide rail, where the drive gear is connected with a drive motor, the elongate push-pull member meshes with the drive gear and is pushed and pulled by bidirectional rotations of the drive gear, the carrier is connected with one end of the elongate push-pull member and a pane of window glass, and the guide rail guides the elongate push-pull member and the carrier in a drive path.

The technique disclosed in Patent Literature 1 relates to the structure of the elongate push-pull member per se, and Patent Literature 1 discloses that the elongate push-pull member is formed by binding and fixing a reinforcing chain to a long flexible body.

In addition, Patent Literature 2 discloses a conventional technique related to a structure for mounting a window regulator. Patent Literature 2 discloses that a window regulator, as well as a door hinge and a door lock, is mounted on a side beam which is fixed to a door outer panel.

Further, Patent Literature 3 discloses a conventional example of a hand-operated window regulator not having a drive motor.

Further, Patent Literature 4 discloses a conventional technique for a window regulator having a rack belt and a drive gear. In this conventional window regulator, the drive gear is connected with a drive motor, and the rack belt is open ended and flexible, meshes with the drive gear, and can be pushed and pulled by bidirectional rotations of the drive gear. The above conventional window regulator further has a rack guide, which guides the rack belt. An end of the rack belt is connected to a window, and the window regulator is configured in such a manner that the window moves up and down by conversion of the torque of the drive gear to a linear motive force.

The rack guide has a pair of side walls which guide movement of the rack belt. Notches are formed in one of the side walls facing the drive gear, while the other side wall is continuously formed. When the drive gear rotates, the force is exerted on the rack belt in the direction away from the drive gear. However, the movement of the rack belt is regulated by the other side wall of the rack guide. Therefore, the rack teeth of the rack belt do not become disengaged from the drive gear, and idling of the drive gear can be prevented.

PRIOR ART LITERATURE

Patent Literature

Patent Literature 1: Japanese Patent Laid-open No. S59-052078
Patent Literature 2: Japanese Registered Patent No. 3215928
Patent Literature 3: U.S. Pat. No. 4,004,371
Patent Literature 4: Japanese Utility Model Laid-open No. S60-068284

SUMMARY OF INVENTION

Problems to be Solved

From the viewpoint of mountability of the window regulator on a component or a part such as a side door of an automobile, it is desirable that the drive motor and the guide rail be in a state in which the drive motor and the guide rail are integrally assembled in a simple structure. In particular, in the case of the window regulator using an open-ended elongate push-pull member, a holding part which holds an orbit of the elongate push-pull member in an idle path is also required to be structured in consideration of mountability on the component or part.

The present invention has been made for solving the above problem, and an object of the present invention is to provide a window regulator which is superior in mountability on a component or a part and can be constituted by a small number of parts.

In addition, the elongate push-pull member is required to have a function of transmitting the torque of the drive motor by efficiently converting the torque to an approximately linear motive force. Since the push-pull member is elongate, it is important to compactly arrange the elongate push-pull member in a layout in the limited space of the door panel while suppressing the lowering of the force transmission efficiency, and reduce the weight of the window regulator.

The present invention has been made for also solving the above problem, and another object of the present invention is to provide a window regulator which can reduce the force transmission loss in the elongate push-pull member, make the layout space compact, and reduce the weight of the window regulator.

Further, in the case where the elongate push-pull member is constituted by a rack belt, it is important to smoothly mesh the rack belt with a drive gear in a meshing portion in which the rack belt is to be meshed with the drive gear, in such a manner that the elongate push-pull member is not entangled with the drive gear.

Still another object of the present invention is to provide a window regulator which has a simple structure stably meshing the rack belt with the drive gear.

Furthermore, in the technique disclosed in Patent Literature 4, when the drive gear rotates, a force in the direction away from the drive gear is constantly applied to the rack belt and the aforementioned other side wall of the rack guide. Therefore, there is a possibility that the other side wall of the rack belt leans. When the other side wall of the rack belt leans, the rack belt can be disengaged from the drive gear, and idling of the drive gear can occur.

The present invention has been made for further solving the above problem, and a further object of the present invention is to provide a window regulator which can prevent idling of the drive gear.

Solution to Problem

In order to achieve the above object, according to the present invention, a window regulator is provided. The window regulator includes a drive gear connected to a drive motor, an elongate push-pull member which is open ended and flexible, meshes with the drive gear, and can be pushed and pulled by bidirectional rotations of the drive gear, a carrier which is connected with one end of the elongate push-pull member and is also connected with a window glass, and a guide rail which guides the elongate push-pull member and the carrier in a drive path. The window regulator is characterized in further including a frame in which a means for fixing and supporting the drive motor, a means for fixing and supporting the guide rail, a means for holding an orbit of the elongate push-pull member in an idle path, and a means for mounting on an object are integrally formed.

In the above window regulator, the means for fixing and supporting the drive motor, the means for fixing and supporting the guide rail, the means for holding the orbit of the elongate push-pull member in the idle path, and the means for mounting on the object can be arranged together in the frame which is a single member. Therefore, the window regulator 1 is superior in mountability on the object which is, for example, a side door of an automobile. In addition, the number of parts can be reduced.

An additional feature of the window regulator according to the present invention is that the means for holding is constituted by an idle-guide portion through which the elongate push-pull member is inserted.

Since the means for holding the orbit of the elongate push-pull member in the idle path is constituted by the idle-guide portion, the structure of the frame in the above window regulator is simplified. Further, in the case where the frame is a resin mold part, the sliding noise produced by the elongate push-pull member moving through the idle-guide portion is reduced.

An additional feature of the window regulator according to the present invention is that the means for fixing and supporting the drive motor includes a motor-fixture portion which is formed as a platelike portion, and approximately an entire length of the idle-guide portion is connected to the motor-fixture portion through a connection portion.

Since approximately the entire length of the idle-guide portion is connected to the motor-fixture portion through the connection portion, deflection of the idle-guide portion, which is an elongate member, can be suppressed.

An additional feature of the window regulator according to the present invention is that a bearing portion which has a circular concave shape and rotatably supports a tip end of an output shaft of the drive motor is formed in the frame.

Since a bearing portion which has a circular concave shape and rotatably supports the tip end of the output shaft of the drive motor is formed in the frame, inclination of the drive gear axially coupled to the output shaft of the drive motor can be prevented, and the elongate push-pull member can be precisely meshed with the drive gear.

An additional feature of the window regulator according to the present invention is that the idle-guide portion is constituted by a curved-orbit guide portion which is formed in a curved shape, and arranged in such a manner that another end of the elongate push-pull member protrudes out of the curved-orbit guide portion on a tail-end side of the idle path.

Since the idle-guide portion is formed in a curved shape, the elongate push-pull member, which is an elongate member, can be compactly laid out in a limited space in, for example, a side door. In addition, since the idle-guide portion is arranged in such a manner that another end of the elongate push-pull member protrudes out of the curved-orbit guide portion on the tail-end side of the idle path, the curved-orbit guide portion can be arranged in a smaller region, so that it is possible to make the curved-orbit guide portion compact and lightweight.

An additional feature of the window regulator according to the present invention is that the drive path is formed to extend upward along a straight line from a meshing portion between the drive gear and the elongate push-pull member, and the curved-orbit guide portion is formed to be convex down and extend to a position at which a tail-end opening of the curved-orbit guide portion faces to an upward direction inclined from a vertical direction to a side near the drive path.

Suppose that the drive path extends downward from the meshing portion. In this case, the drive motor is located on the upper side. Therefore, the window regulator is required to be configured such that no interference with the drive motor occurs in the portion at which the carrier is connected to the window glass. In addition, the center of gravity of the window regulator is likely to be high. On the other hand, in the case where the drive path is arranged to be directed upward from the meshing portion as in the present invention, the drive motor is located in the lower portion of the window regulator, and the structure for connecting the carrier to the window glass can be simple. Therefore, the center of gravity of the window regulator is low, so that the window regulator according to the present invention is preferable for application to the side door of the automobile, in which the center of gravity is required to be lowered. Further, the drive path is linearly formed. In other words, the portion of the elongate push-pull member which is located in the drive path does not include a curved portion. Therefore, no bending stress occurs in the drive path, so that force transmission loss caused by the elongate push-pull member is reduced, and the torque of the drive motor is efficiently converted to the linear motive force and is then transmitted. Furthermore, since the curved-orbit guide portion is formed to be convex down and extend to the position at which the tail-end opening faces to an upward direction inclined to the drive path side from the vertical direction, the elongate push-pull member can be turned up, retreated, and housed in a further compact arrangement.

An additional feature of the window regulator according to the present invention is that the elongate push-pull member is constituted by a rack belt having a rack-teeth surface, a first belt side surface, a second belt side surface, and a belt back surface and being arranged in such a manner that the rack-teeth surface faces to an inner side of a curved orbit of the idle path; the curved-orbit guide portion is constituted by a rectangular-pipe member of a rectangular cross-sectional shape, having an inner-peripheral guide wall, a first side guide wall, a second side guide wall, and an outer-peripheral guide wall, which respectively guide the rack-teeth surface, the first belt side surface, the second belt side surface, and the belt back surface; and a protrusion which presses the first belt side surface or the second belt side surface is formed on an inner side of the first guide side wall or the second guide side wall in a vicinity of a tail-end opening of the rectangular-pipe member.

Since, in the above window regulator, a side surface of the rack belt is pressed by the protrusion in the close vicinity of the tail-end opening of the rectangular-pipe member, deflection of the protruded portion of the rack belt in a width direction is suppressed.

An additional feature of the window regulator according to the present invention is that an opening extending to the tail-end opening of the rectangular-pipe member is formed in the first guide side wall or the second guide side wall which is opposed to the protrusion in such a manner that the rack belt pressed by the protrusion is displaced to escape in the width direction.

In the above window regulator, the rack belt pressed by the protrusion body is displaced to escape into the opening in the side wall of the rectangular-pipe member. Therefore, no belt side surface is strongly pressed on the side wall of the rectangular-pipe member, so that increase in the sliding friction between the rack belt and the rectangular-pipe member is suppressed.

An additional feature of the window regulator according to the present invention is that the elongate push-pull member is constituted by a rack belt having a rack-teeth surface, a first belt side surface, a second belt side surface, and a belt back surface and being arranged in such a manner that the rack-teeth surface faces to an inner side of a curved orbit of the idle path; the curved-orbit guide portion is constituted by a rectangular-pipe member of a rectangular cross-sectional shape, having an inner-peripheral guide wall, a first side guide wall, a second side guide wall, and an outer-peripheral guide wall, which respectively guide the rack-teeth surface, the first belt side surface, the second belt side surface, and the belt back surface; the inner-peripheral guide wall and the outer-peripheral guide wall are formed to broaden the curved-orbit guide portion in a vicinity of a tail-end opening of the curved-orbit guide portion; and a gap between the rack belt and the inner-peripheral guide wall is set greater than a gap between the rack belt and the outer-peripheral guide wall at the tail-end opening, and a position at which broadening of the curved-orbit guide portion begins in the inner-peripheral guide wall is more distant from the tail-end opening than a position at which broadening of the curved-orbit guide portion begins in the outer-peripheral guide wall.

In the above window regulator, the rack teeth are prevented from being caught by the tail-end opening of the rectangular-pipe member, and the rack belt is guided to the close vicinity of the tail-end opening.

An additional feature of the window regulator according to the present invention is that the elongate push-pull member is constituted by a rack belt, the frame includes an annular-wall portion which is annularly formed around a shaft center of the drive gear so as to surround teeth surfaces of the drive gear, an opening is formed in the annular-wall portion, and a portion of the drive gear is exposed from the opening of the annular-wall portion and meshes with the rack belt, and a gap S1 between a teeth surface of the drive gear and one, relatively near to the drive path, of both wall edges of the annular-wall portion having the opening is set smaller than a gap S2 between a teeth surface of the drive gear and an inner peripheral surface of the annular-wall portion.

The annular-wall portion is arranged to surround the drive gear for improving water tightness, dust tightness, and the like for the drive gear. In the case where the window regulator uses the structure in which a portion of the drive gear is exposed from the opening of the annular-wall portion and meshes with the rack belt, there is a possibility that the rack belt is caught into the gap between the annular-wall portion and the drive gear. In particular, the load caused by ascent and descent of the window glass is imposed on the portion of the rack belt located on the drive path side. Therefore, excessive bending deformation can occur in the portion of the rack belt located on the drive path side, so that the portion of the rack belt can be caught into the gap between the drive gear and the wall edge on the drive path side.

In order to overcome the above problem, the gap S1 between the teeth surface of the drive gear and the wall edge on the drive path side is set smaller than the gap S2 between the teeth surface of the drive gear and an inner peripheral surface of the annular-wall portion. Therefore, it is possible to prevent the rack belt from being caught. If the gap S2 is set small over the entire annular-wall portion, the quality control of the gap S2 becomes difficult because of the manufacturing error of the annular-wall portion, the fabrication error of the drive gear, and the like. On the other hand, according to the present invention, the target of the quality control can be limited to only one point, for example, by setting the gap S2 to a sufficiently large value and setting only the gap S1 at the wall edge to a small value.

An additional feature of the window regulator according to the present invention is that a step face is formed on aside of the rack teeth of the rack belt, the frame includes a meshing-portion guide wall and a meshing-portion guide protrusion in a meshing portion between the drive gear and the elongate push-pull member, the meshing-portion guide wall guides the belt back surface of the rack belt, and the meshing-portion guide protrusion guides the step face.

Since, in the above window regulator, the rack belt is guided by the meshing-portion guide wall and the meshing-portion guide protrusion, deflection of the rack belt in the belt thickness direction is suppressed, and the depth of the mesh between the drive gear and the rack teeth is maintained constant.

An additional feature of the window regulator according to the present invention is that a bearing portion which has a circular concave shape and rotatably supports a tip end of an output shaft of the drive motor is formed in the frame, the bearing portion is formed as an annular-wall portion protruding toward a side near the drive motor, and an outer peripheral surface of the bearing portion guides an inner peripheral surface of the drive gear so as to determine a position of the inner peripheral surface of the drive gear.

In the above window regulator, for example, in the case where the drive gear is axially coupled to the output shaft in such a manner that the drive gear cannot rotate relative to the output shaft and can slide along the axial direction, for example, by using a spline coupling, the structure in which the output shaft of the drive motor is rotatably supported by the bearing portion and the inner peripheral surface of the drive gear is positioned and guided by the outer peripheral surface of the bearing portion enables precise and easy determination of the relative positions among the three parts as the drive gear, the drive motor, and the rack belt by the frame. Therefore, the meshing between the drive gear and the rack teeth can be precisely controlled.

An additional feature of the window regulator according to the present invention is that the frame includes a meshing-portion guide wall and a connection portion of the drive motor and the frame, the meshing-portion guide wall is arranged on a side opposite to the drive gear with respect to the elongate push-pull member and guides movement of the elongate push-pull member, and the connection portion is arranged in a vicinity of a meshing portion in which the elongate push-pull member is meshed with the drive gear, on a side opposite to the drive gear with respect to the meshing-portion guide wall.

In the above window regulator, it is possible to reinforce the meshing-portion guide wall and prevent inclination of the meshing-portion guide wall by arranging the connection portion of the drive motor and the frame in the vicinity of the meshing portion in which the elongate push-pull member is meshed with the drive gear, on the side opposite to the drive gear against the meshing-portion guide wall. Therefore, the elongate push-pull member can be suitably guided so that idling of the drive gear can be prevented.

An additional feature of the window regulator according to the present invention is that the connection portion is formed on an extension of a line connecting the output shaft of the drive motor and the meshing portion.

Since the greatest force is exerted on the part of the meshing-portion guide wall which is located on the extension of the line connecting the output shaft and the meshing portion, the above structure can effectively prevent inclination of the meshing-portion guide wall.

Advantageous Effect of Invention

According to the present invention, the means for fixing and supporting the drive motor, the means for fixing and supporting the guide rail, the means for holding the orbit of the elongate push-pull member in the idle path, and the means for mounting on the object can be arranged together in the frame which is a single member. Therefore, the number of parts can be reduced. In addition, according to the present invention, force transmission loss caused by the elongate push-pull member is reduced, the space in which the window regulator is laid out becomes compact, and the weight of the window regulator is reduced. Further, according to the present invention, stable meshing between the drive gear and the rack belt can be realized by a simple structure. Furthermore, according to the present invention, idling of the drive gear can be suppressed.

BRIEF DESCRIPTION OF DRAWINGS

FIG. 24A is a cross-sectional view of a rectangular-pipe member in a vicinity of a tail-end opening.

FIG. 24B is a cross-sectional view at the K-K cross section indicated in FIG. 24A.

FIG. 25 is a cross-sectional side view of the rectangular-pipe member in the vicinity of the tail-end opening in the second embodiment of the present invention.

DESCRIPTION OF EMBODIMENTS

Hereinbelow, an embodiment in which a window regulator is applied to a side door in an automobile is explained. In the following explanations, the direction along a plate surface of a pane of window glass in a plan view (i.e., the front-rear direction of the automobile) is denoted by the P direction, and the direction approximately perpendicular to the plate surface of the window glass (i.e., the width direction of the automobile) is denoted by the Q direction.

First Embodiment

Figure 1:
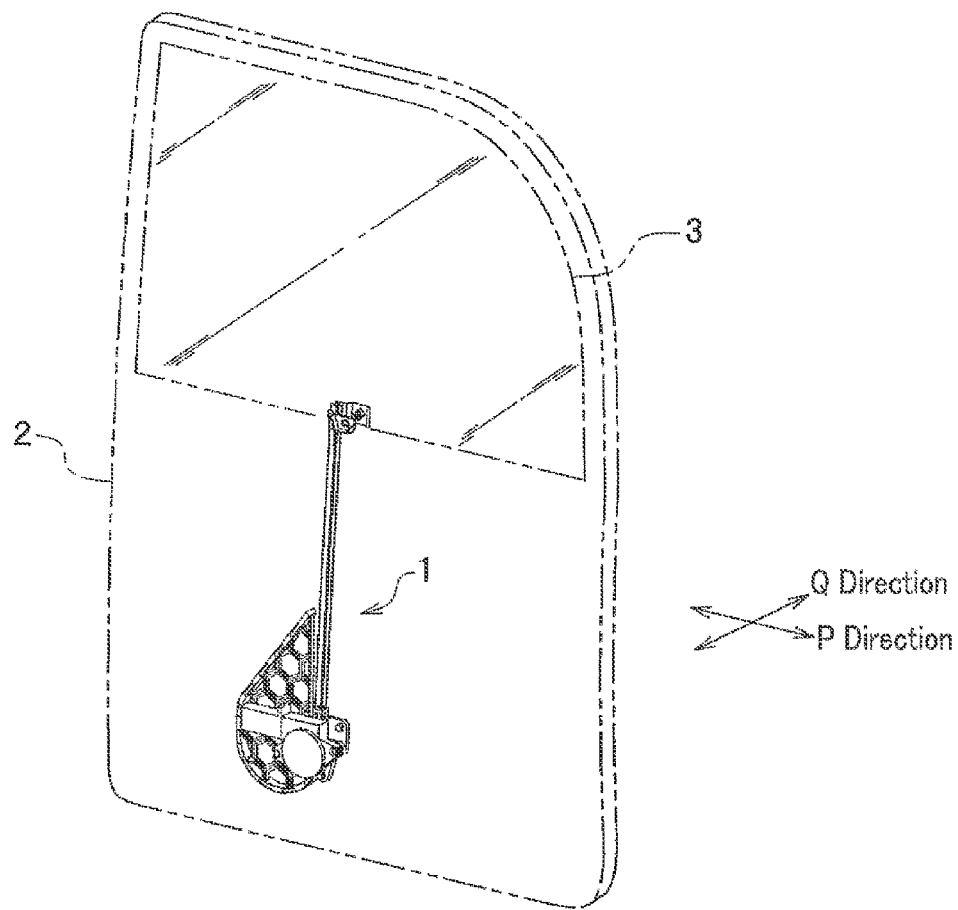
FIG. 1 is a perspective exterior view illustrating an embodiment in which a window regulator according to the present invention is applied to a side door in an automobile.
Figure 3:
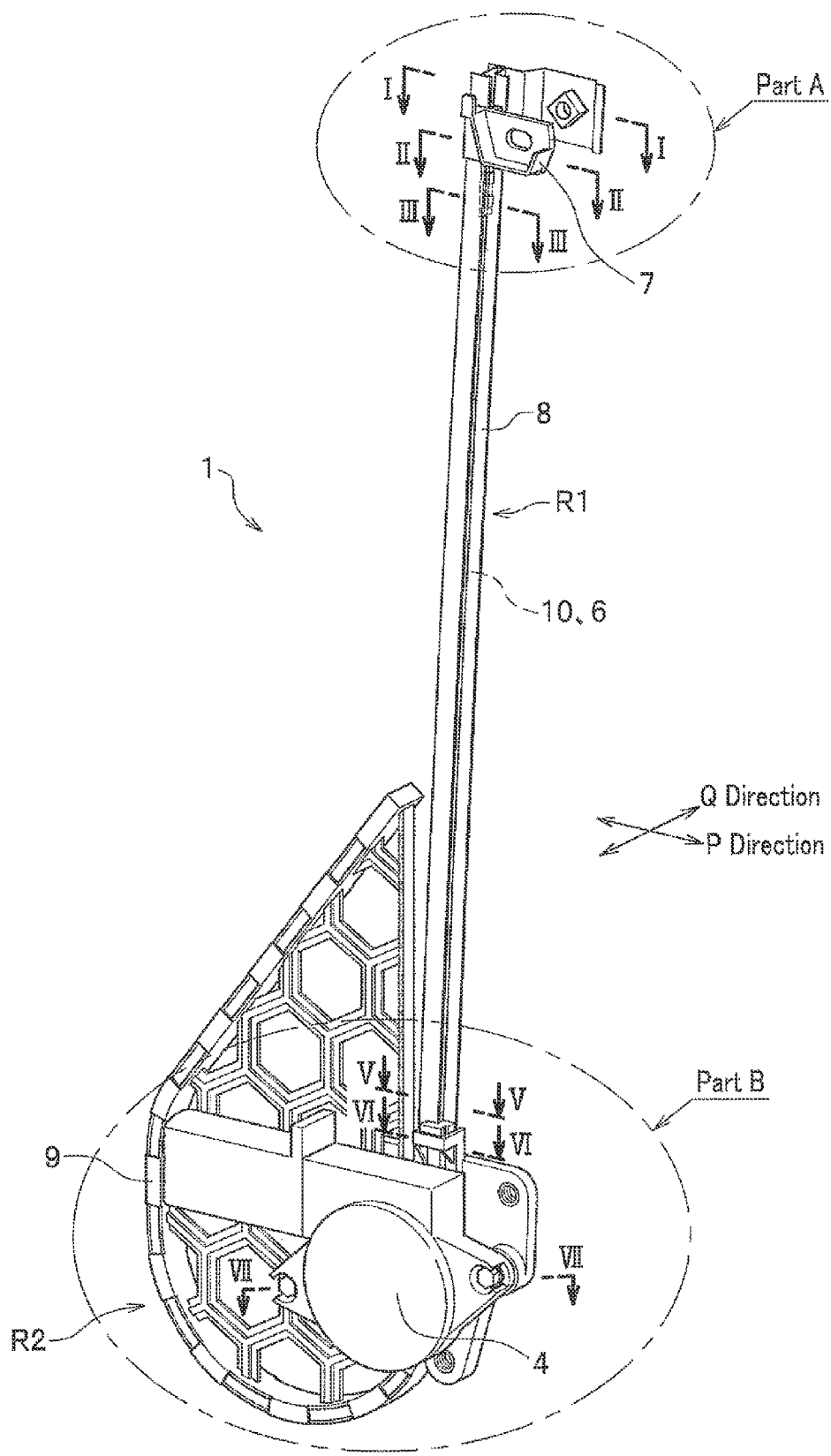
FIG. 3 is a perspective exterior view illustrating a window regulator according to the present invention.

As illustrated in FIG. 1, a window regulator 1 according to the present invention, which moves up and down a pane of window glass 3, is built inside a lower portion of a side door 2 in an automobile. As illustrated in FIG. 3, the window regulator 1 is constituted mainly by a drive motor 4, a drive gear 5, an elongate push-pull member 6, a carrier 7, a guide rail 8, and a frame 9. The drive gear 5 (illustrated in FIGS. 11A and 11B) is axially coupled to the output shaft of the drive motor 4. The elongate push-pull member 6 is open ended, i.e., having one end and the other end, and flexible, meshes with the drive gear 5, and can be pushed and pulled by bidirectional rotations of the drive gear 5. The carrier 7 is connected with the one end of the elongate push-pull member 6 and is also connected with the window glass 3. The guide rail 8 guides the elongate push-pull member 6 and the carrier 7 in a drive path R1. A means for fixing and supporting the drive motor 4, a means for fixing and supporting the guide rail 8, a means for holding an orbit of the elongate push-pull member 6 in an idle path R2, and a means for mounting the window regulator 1 on an object (the side door 2) are integrally formed in the frame 9.

Figure 2:
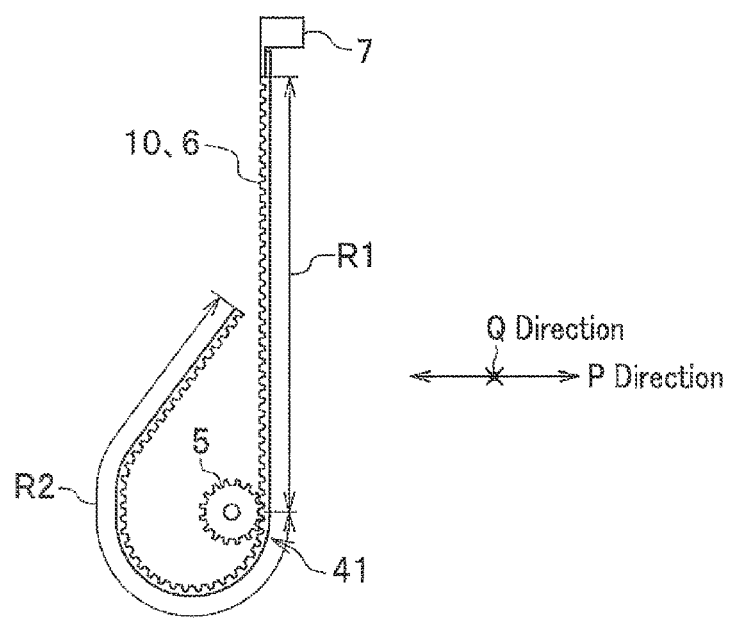
FIG. 2 is a schematic side view illustrating a drive path and an idle path of the elongate push-pull member.

In FIG. 2, the drive path R1 is a path in which the torque of the drive gear 5 converted to an approximately linear motive force for moving the carrier 7 is transmitted to the carrier 7. Specifically, the drive path R1 is a path through which the elongate push-pull member 6 moves, and which extends from the meshing portion 41 at which the drive gear 5 meshes with the elongate push-pull member 6 to a carrier mounting portion (the engagement portion 42 shown in FIG. 4) at which the carrier 7 is mounted. The idle path R2 is a path provided for retreating the portion of the elongate push-pull member 6 which is not used when the carrier 7 is moved down. When viewed from the Q direction, the drive path R1 is formed in a straight line, and at least a portion of the idle path R2 is formed in a curved shape.

<Elongate Push-Pull Member 6, Carrier 7>

The elongate push-pull member 6 and the carrier 7 are explained below with reference to FIGS. 4 and 6 to 8. The elongate push-pull member 6 in the present embodiment is realized by a rack belt 10 having a surface on which rack teeth 10A are formed. Therefore, the drive gear 5 which meshes with the rack belt 10 is a pinion gear. The rack belt 10 is made of, for example, a synthetic resin. The rack belt 10 is laid out in such a manner that the rack teeth 10A face to the P direction.

The carrier 7 has a glass connection part 7A and a belt connection part 7B. The glass connection part 7A is formed to have a plate surface along the P direction and connected with a lower portion of the window glass 3, and the belt connection part 7B is arranged to protrude from a surface of the glass connection part 7A and connected with an end of the rack belt 10. The glass connection part 7A has an approximately rectangular shape which laterally extends when viewed from the Q direction. In addition, a mounting hole 7C through which a bolt (not shown) for fixing the window glass 3 is to be inserted is formed in the glass connection part 7A. Further, a wall 7D for preventing falling down of the window glass 3 is arranged to protrude from another surface of the glass connection part 7A.

Figure 4:
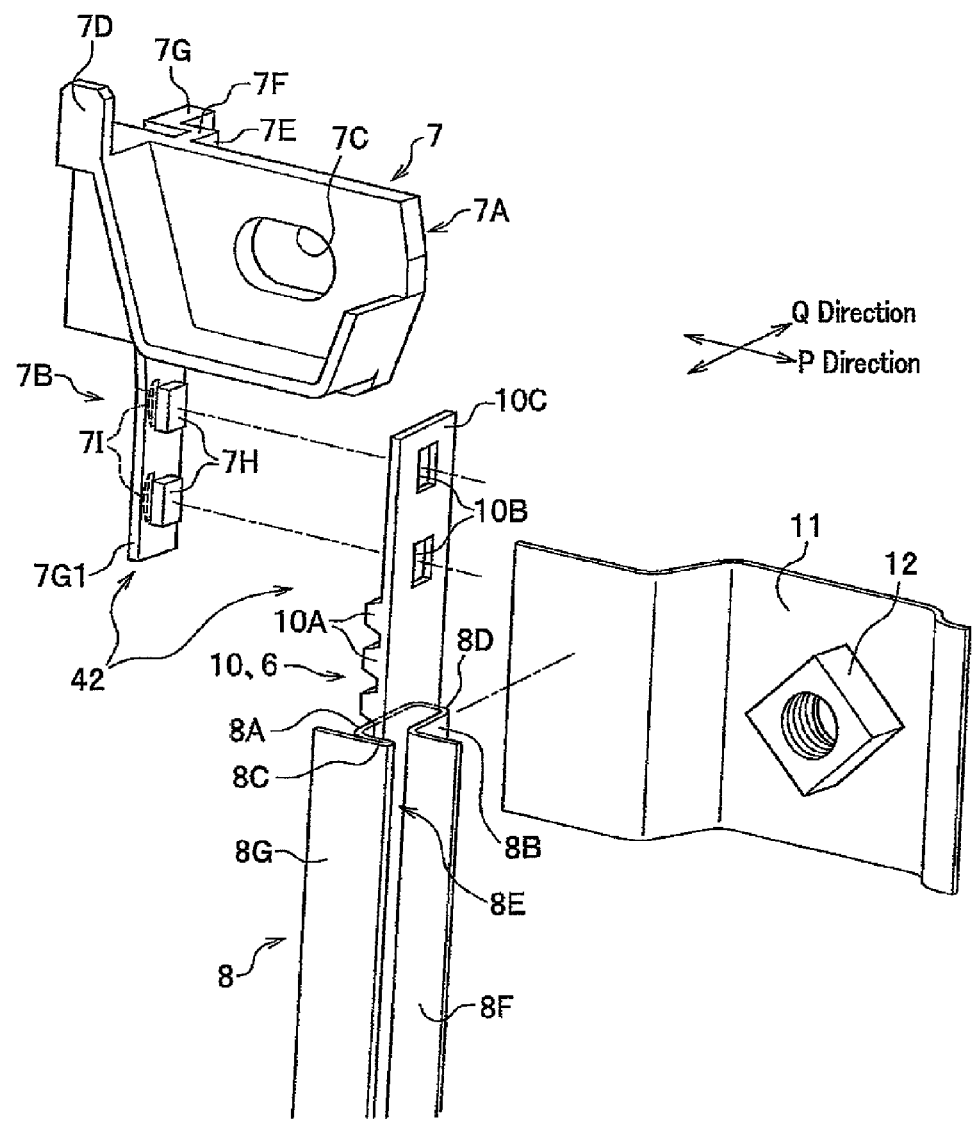
FIG. 4 is an exploded perspective view of the part A in FIG. 3.
Figure 7:
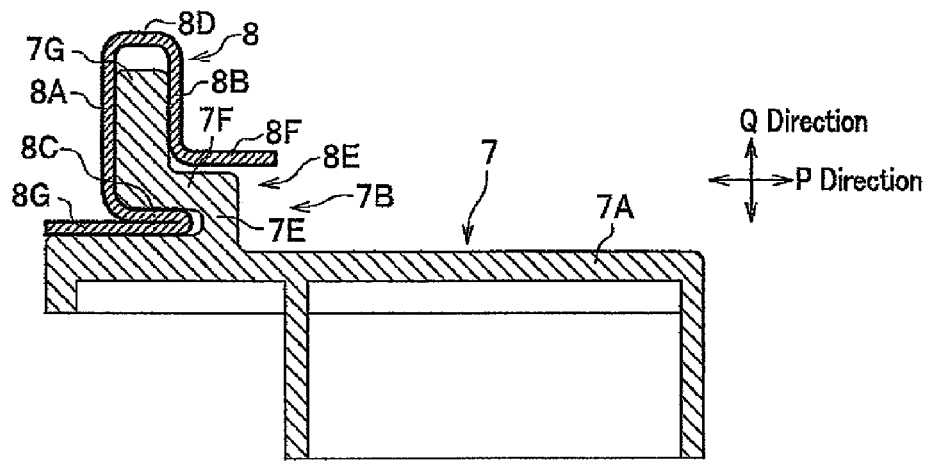
FIG. 7 is a cross-sectional view at the II-II cross section indicated in FIG. 3.

The belt connection part 7B has a shape of a crank in the plan view as illustrated in FIG. 7. The belt connection part 7B includes a base portion 7E, an intermediate portion 7F, and a slide portion 7G. The base portion 7E is formed to protrude from a surface of the glass connection part 7A in a direction perpendicular to the surface, the intermediate portion 7F is arranged to extend from the top of the base portion 7E in a direction parallel to the surface of the glass connection part 7A, and the slide portion 7G is arranged to extend from the tip end of the intermediate portion 7F in a direction away from the surface of the glass connection part 7A. While the base portion 7E and the intermediate portion 7F extend downward to the bottom end of the glass connection part 7A, the slide portion 7G is arranged to extend downward beyond the bottom end of the glass connection part 7A as illustrated in FIG. 4. The extension of the slide portion 7G beyond the bottom end of the glass connection part 7A is formed to be a thin plate portion 7G1, and a pair of engagement protrusions 7H each having the shape of a rectangular parallelepiped are formed at upper and lower positions on a surface of the thin plate portion 7G1. In addition, elastic protrusions 7I each having an arc-like profile along the vertical direction are formed at the positions right behind the engagement protrusions 7H on another surface of the thin plate portion 7G1.

Figure 8A:
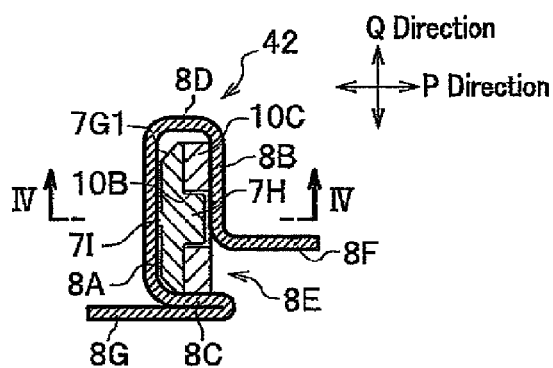
FIG. 8A is a cross-sectional view at the cross section indicated in FIG. 3.
Figure 8B:
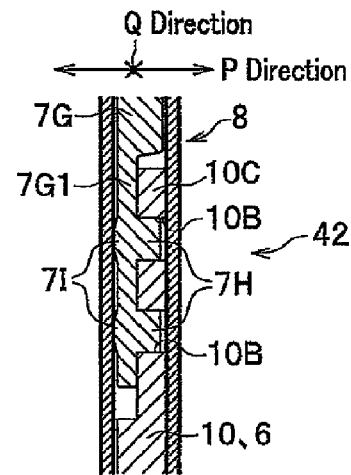
FIG. 8B is a cross-sectional view at the IV-IV cross section indicated in FIG. 8A.

As illustrated in FIGS. 4 and 8B, the side of the rack belt 10 on which the rack teeth 10A is formed, in a vicinity of an end of the rack belt 10, is cut off to a depth equivalent to the plate thickness of the thin plate portion 7G1 in the belt connection part 7B so as to form a thin belt portion 10C. The thin belt portion 10C is perforated at upper and lower positions to produce a pair of rectangular holes, which are formed as a pair of engagement holes 10B. When the thin plate portion 7G1 is placed over the thin belt portion 10C in the rack belt 10 so that the engagement protrusions 7H are respectively engaged with the engagement holes 10B, the belt connection part 7B is connected with the rack belt 10. In this way, the engagement portion 42 in which the rack belt 10 and the carrier 7 are engaged with each other is arranged inside the guide rail 8, and does not come out of the guide rail 8 unless the window regulator 1 is decomposed.

<Guide Rail 8>

The guide rail 8 is explained below with reference to FIGS. 4 and 6 to 8. The guide rail 8 is an elongate member having a fixed cross section and being approximately vertically arranged. In view from the P direction, the guide rail 8 has a gently curved shape corresponding to a curved profile of the window glass 3. In addition, in view from the Q direction, the guide rail 8 has a profile along a straight line. Further, the guide rail 8 includes a rectangular frame portion having a rectangular cross section elongated in the Q direction as illustrated in the plan view of FIG. 8A so as to guide four sides of the rack belt 10. The rectangular frame portion is constituted by first to fourth frame face portions 8A, 8B, 8C, and 8D, where the first frame face portion 8A faces the surface of the rack belt 10 on which the rack teeth 10A is formed, the second frame face portion 8B faces the surface of the rack belt 10 opposite to the surface of the rack belt 10 on which the rack teeth 10A is formed (i.e., the back surface of the rack belt 10), and the third and fourth frame face portions 8C and 8D respectively face the side surfaces of the rack belt 10. The inside space surrounded by the above rectangular frame portion realizes a guide groove for the rack belt 10. That is, the engagement portion 42 in which the rack belt 10 and the carrier 7 are engaged with each other is laid out in the guide groove for the rack belt 10 in the guide rail 8. The third frame face portion 8C is a face which is opposed to one surface of the glass connection part 7A of the carrier 7. In addition, an opening 8E through which the belt connection part 7B (specifically, the intermediate portion 7F) is inserted is formed in part of the second frame face portion 8B near the third frame face portion 8C. Further, a first flange face portion 8F is arranged to protrude along the P direction from an edge portion of the opening 8E which is near the fourth frame face portion 8D, and a second flange face 8G is arranged almost as an extension of the third frame face portion 8C to protrude to a direction opposite to the first flange face portion 8F.

For example, the guide rail 8 is formed by sheet metal working, and is specifically a part which is integrally formed by forming the first flange face portion 8F, the second frame face portion 8B, the fourth frame face portion 8D, the first frame face portion 8A, the third frame face portion 8C, and the second flange face portion 8G in this order by bending. The second flange face portion 8G is formed by folding back the third frame face portion 8C. Alternatively, the guide rail 8 may be realized by an extruded part.

In addition, a fixture bracket 11 for fixing the window regulator 1 to the side door 2 is attached, by welding or the like, to the fourth frame face portion 8D in the vicinity of the upper end of the guide rail 8. The fixture bracket 11 is formed to have a plate surface approximately along the P direction. Further, in order to fix the window regulator 1 to the side door 2, a nut 12 into which a fastening bolt (not shown) is to be screwed is attached to the fixture bracket 11.

<Frame 9>

The frame 9 is explained below with reference to FIGS. 5 and 9 to 11. The frame 9 includes a motor-fixture portion 13 for fixing and supporting the drive motor 4, a guide-rail fixture portion 14 for fixing and supporting the lower end of the guide rail 8, and an idle-guide portion 15 for holding the orbit of the rack belt 10 in the idle path R2. For example, the frame 9 is a resin mold part constituted by the motor-fixture portion 13, the guide-rail fixture portion 14, and the idle-guide portion 15 which are integrally formed.

<Motor Fixture Portion 13 (Means for Fixing and Supporting Drive Motor 4)>

Figure 11A:
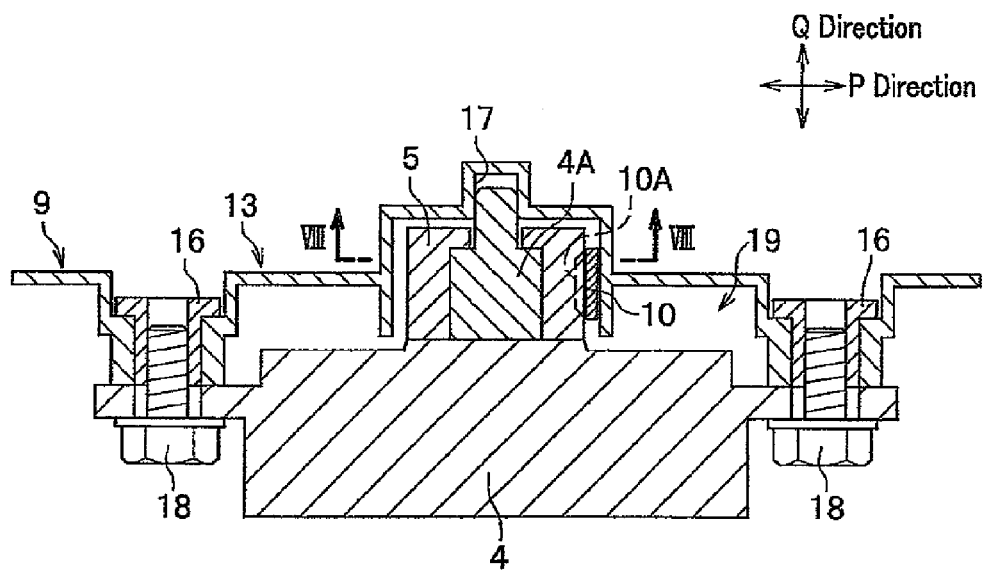
FIG. 11A is a cross-sectional view at the VI-VI cross section indicated in FIG. 3.
Figure 11B:
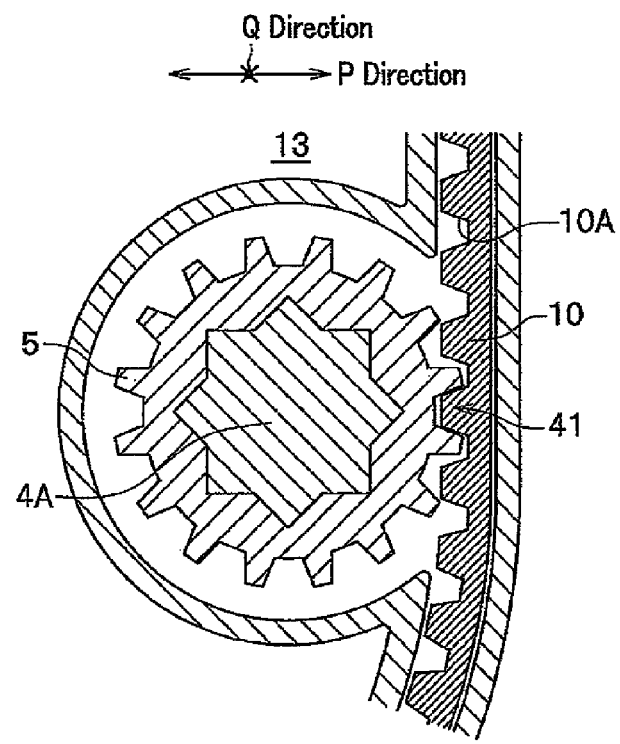
FIG. 11B is a cross-sectional view at the VIII-VIII cross section indicated in FIG. 11A.

The motor-fixture portion 13 is formed as a platelike portion of the frame 9 which is arranged approximately along a plane perpendicular to the Q direction and has multiple protrusions and recesses as illustrated in FIG. 11A. Multiple nuts 16 are fixed on the motor-fixture portion 13, for example, by press-in or insert molding. In addition, a bearing portion 17 having a circular concave shape and rotatably supporting a tip end of the output shaft 4A of the drive motor 4 is formed in the motor-fixture portion 13. The motor-fixture portion 13 and the nuts 16 arranged on the motor-fixture portion 13 constitute a means for fixing and supporting the drive motor 4. The drive motor 4 is fixed to the motor-fixture portion 13 by screwing bolts 18 into the multiple nuts 16 while the tip end of the output shaft 4A of the drive motor 4 is rotatably supported by the bearing portion 17. Since the tip end of the output shaft 4A of the drive motor 4 is rotatably supported by the bearing portion 17, inclination of the drive gear 5, which is axially coupled to the output shaft 4A, is prevented, so that the rack teeth 10A of the rack belt 10 precisely mesh with the drive gear 5.

When the drive motor 4 is fixed to the motor-fixture portion 13, a space around the drive gear 5 becomes an enclosed space 19, which is enclosed by the chassis of the drive motor 4 and a molded surface of the motor-fixture portion 13. The enclosed space 19 is formed for the purpose of water tightness, dust tightness, and the like. In addition, a guide path for guiding the rack belt 10 when the rack belt 10 moves between the guide-rail fixture portion 14 and the idle-guide portion 15 may be formed as needed.

<Guide-Rail Fixture Portion 14 (Means for Fixing and Supporting Guide Rail 8)>

Figure 5:
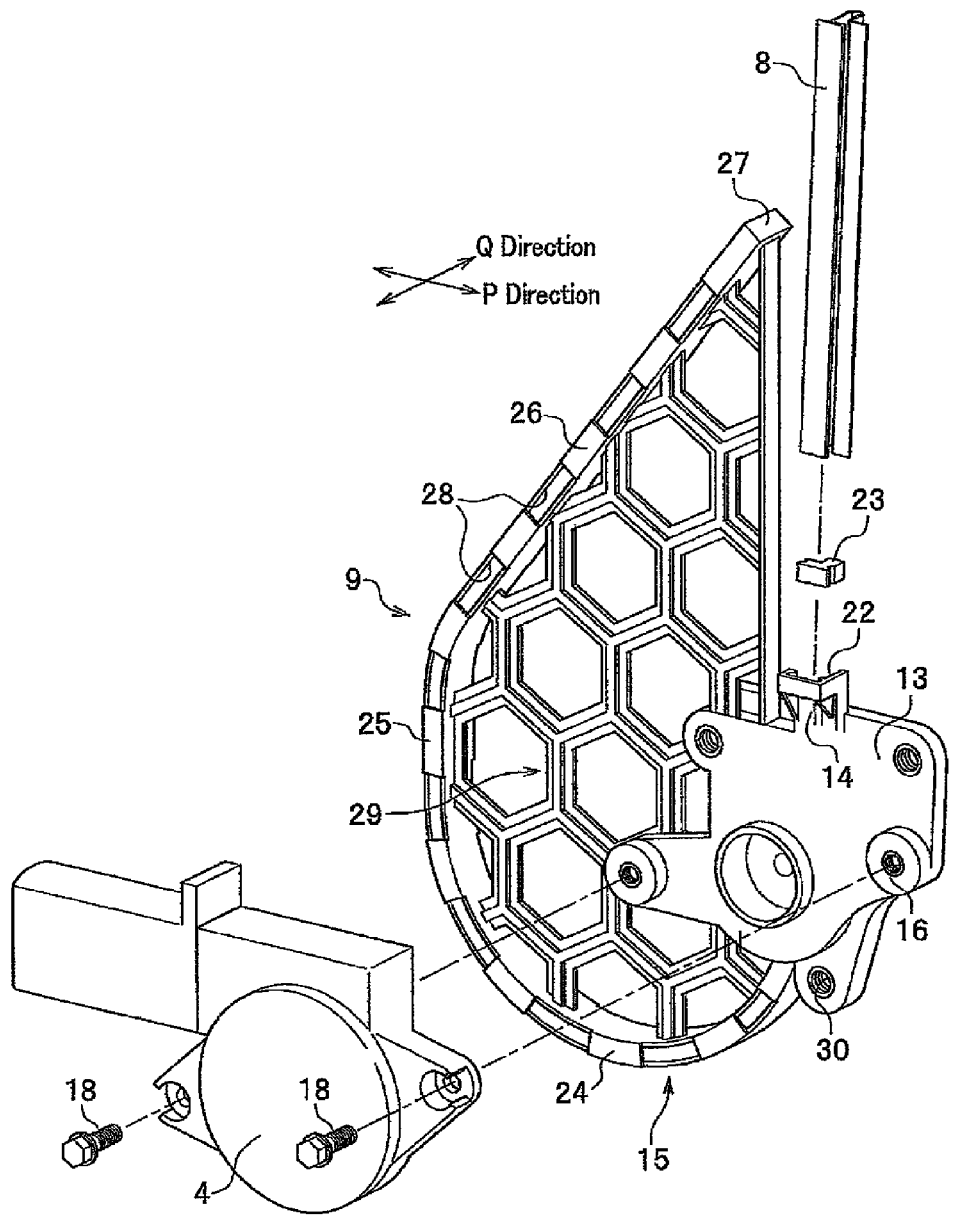
FIG. 5 is an exploded perspective view of the part B in FIG. 3.
Figure 6:
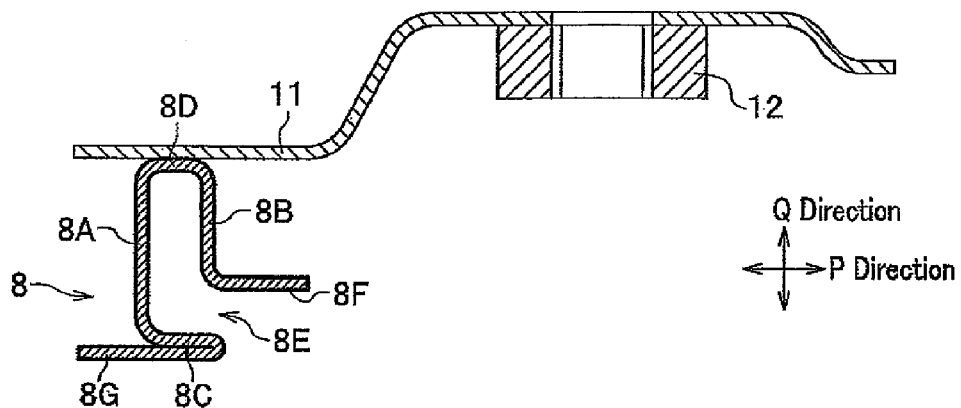
FIG. 6 is a cross-sectional view at the I-I cross section indicated in FIG. 3.
Figure 10:
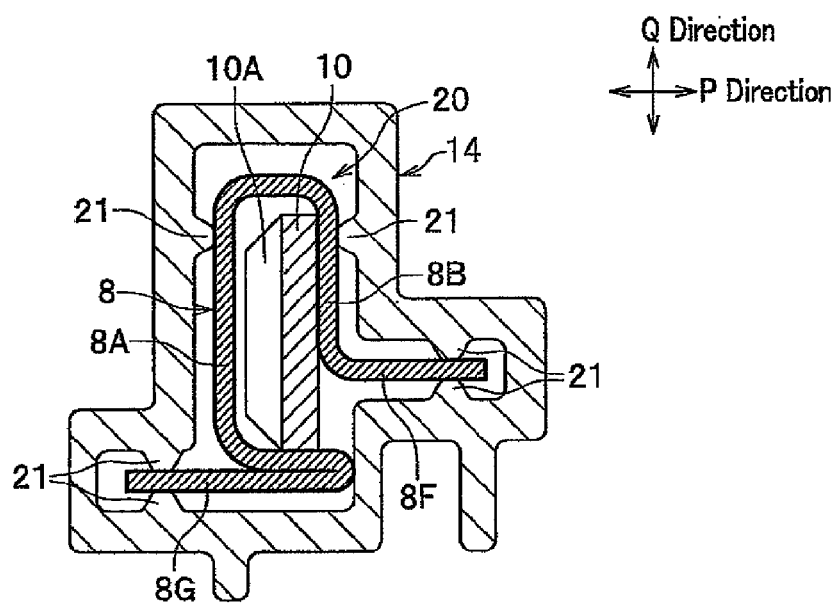
FIG. 10 is a cross-sectional view at the VI-VI cross section indicated in FIG. 3.

The guide-rail fixture portion 14 as illustrated in FIG. 5 is a portion located on the upper portion of the motor-fixture portion 13, and is formed to have an opening 20 as illustrated in FIG. 10. The opening 20 is a vertical through hole into which the bottom end portion of the guide rail 8 is to be inserted for fixing the bottom end portion of the guide rail 8 to the motor-fixture portion 13. The bottom end of the opening 20 faces the enclosed space 19 (illustrated in FIG. 11A). Multiple fixture ribs 21 are arranged along the vertical direction to protrude from the inner surfaces of the walls constituting the opening 20, so that the bottom end portion of the guide rail 8 is pressed by the fixture ribs 21 and fixed to the guide-rail fixture portion 14. Specifically, the position of the guide rail 8 in the P direction relative to the frame 9 is determined by pressing a position on each of the first and second frame face portions 8A and 8B with one of the fixture ribs 21, and the position of the guide rail 8 in the Q direction relative to the frame 9 is determined by pressing each of the first and second flange surfaces 8F and 8G so as to hold each of the first and second flange surfaces 8F and 8G between a pair of the fixture ribs 21.

Figure 9:
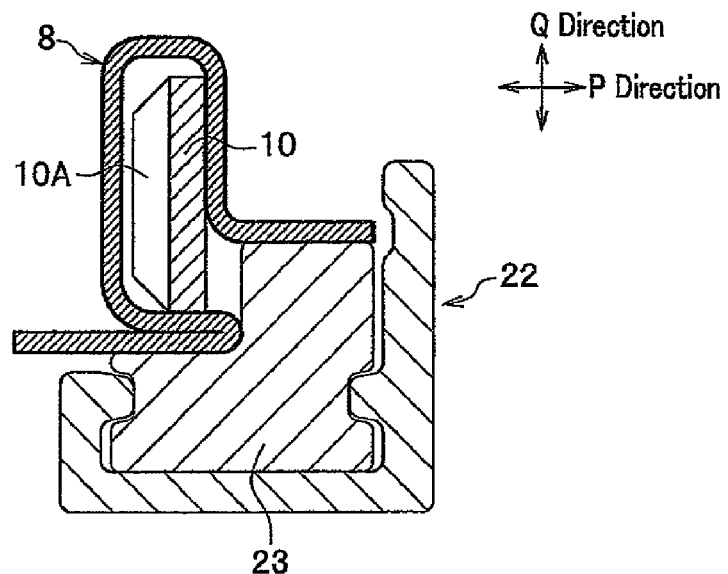
FIG. 9 is a cross-sectional view at the V-V cross section indicated in FIG. 3.

A stopper fixture portion 22 as illustrated in FIGS. 5 and 9 is formed above the opening 20 in the frame 9, and a stopper 23 is attached to the stopper fixture portion 22 in such a manner that the stopper 23 is inserted from the upper side of the stopper fixture portion 22. The stopper 23 is, for example, made of a rubber mold part. The stopper 23 limits the downward motion of the carrier 7 by coming into contact with the carrier 7. In addition, the stopper 23 has watertight and dust-tight functions for the enclosed space 19 (illustrated in FIG. 11A) since the stopper 23 covers part of the gaps between the guide rail 8 and the inner walls of the opening 20 from the upper side.

<Idle-Guide Portion 15 (Means for Holding Orbit of Elongate Push-Pull Member 6 in Idle Path R2)>

In FIG. 5, the idle-guide portion 15 is formed as a rectangular-pipe member having a rectangular cross section whose longitudinal direction is in parallel with the Q direction. The rectangular-pipe member is formed so as to be able to guide the four sides of the rack belt 10 inserted through the inside of the rectangular-pipe member. The idle-guide portion 15 has a tip end which faces the enclosed space 19 (illustrated in FIG. 11A). The idle-guide portion 15 is arranged to extend from the bottom of the motor-fixture portion 13, and passes through a curved portion 24, a vertical portion 25, and an inclined straight portion 26 so as to turn up. The curved portion 24 is convex down, the vertical portion 25 approximately vertically extends, and the inclined straight portion 26 is inclined in such a manner that the distance from the vertical portion 25 to the guide rail 8 decreases with increase in the elevation. The tail end 27 of the idle-guide portion 15 is located above the meshing portion 41 in which the rack belt 10 meshes with the drive gear 5 and near the guide rail 8. Perforations 28 for the purpose of weight reduction and the like are formed at appropriate intervals along the direction in which the idle-guide portion 15 extends, in the side walls of the idle-guide portion 15 facing to the Q direction. The curved portion 24, the vertical portion 25, the inclined straight portion 26, and the motor-fixture portion 13 are connected and reinforced by a connection portion 29. That is, the connection portion 29 has a function of connecting the entire length of the idle-guide portion 15 to the motor-fixture portion 13. Therefore, the connection portion 29 can suppress deflection of the idle-guide portion 15 which is an elongate part. For example, the connection portion 29 is a planar member or a frame-like member formed along a plane perpendicular to the Q direction. From the viewpoint of strength and weight reduction, it is preferable that the connection portion 29 be a frame-like member having a honeycomb structure for reinforcement as in the present embodiment.

<Mounting Hole 30 (Means for Mounting on Object)>

Multiple mounting holes 30 are formed around the motor-fixture portion 13 in the frame 9 as a means for mounting the window regulator 1 on an object (for example, the side door 2). The lower portion of the window regulator 1 is fixed to the side door 2 (FIG. 1) by screwing bolts through the mounting holes 30 in the frame 9, and the upper portion of the window regulator 1 is fixed to the side door 2 by screwing the bolt through the fixture bracket 11 (FIG. 4) as described before.

<Operations>

When the drive motor 4 is driven, the rack belt 10 meshing with the drive gear 5 moves in the drive path R1 straightly in view from the Q direction, and the carrier 7, which is engaged with the top end of the rack belt 10 through the engagement protrusions 7H and the engagement holes 10B, moves up and down while being guided by the guide rail 8, so that the window glass 3 moves up and down. The position of the carrier 7 in the P direction relative to the guide rail 8 is determined when the back surface of the thin belt portion 10C of the rack belt 10 is in contact with the second frame face portion 8B, and the elastic protrusions 7I, which is protruding from the thin plate portion 7G1, are in contact with the first frame face portion 8A. In addition, the position of the carrier 7 in the Q direction relative to the guide rail 8 is determined when the third frame face portion 8C and the second flange face portion 8G are held between the intermediate portion 7F, the slide portion 7G of the belt connection part 7B and the aforementioned surface of the glass connection part 7A. In the above positions determined in the P and Q directions, the carrier 7 slides along the guide rail 8. The portion of the rack belt 10 which is not used when the carrier 7 is moved down is turned up by the idle-guide portion 15 so as to be retreated and housed.

The rack belt 10, which moves through the guide rail 8, is laid out in such a manner that the surface of the rack belt 10 on which the rack teeth 10A are formed faces the first frame face portion 8A, which is on the side opposite to the opening 8E. Therefore, even dust or water enters the guide rail 8 from the opening 8E, it is possible to suppress entry of dust or water into the side on which the rack teeth 10P, are formed, and prevent intrusion of the dust into the meshing portion 41.

According to the present invention, the window regulator 1 includes the frame 9, in which the means for fixing and supporting the drive motor 4, the means for fixing and supporting the lower end of the guide rail 8, the means for holding the orbit of the rack belt 10 in the idle path R2, and the means for mounting the window regulator 1 on an object on which the window regulator 1 is to be mounted (the side door 2) are integrally formed. Therefore, the function of fixing and supporting the drive motor 4, the function of fixing and supporting the guide rail 8, the function of holding the orbit of the elongate push-pull member 6 in the idle path R2, and the function of mounting the window regulator 1 on the object (the side door 2) can be integrated in the frame 9 which is a single part of the window regulator 1. Therefore, the window regulator 1 according to the present invention is superior in mountability on the object (the side door 2) and enables reduction in the number of parts.

In addition, in the case where the frame 9 is made of a resin mold part, the weight of the window regulator 1 can be reduced, and the frame 9 can be easily formed to have a shape realizing the above-mentioned functions. In the case where the means for holding the orbit of the elongate push-pull member 6 in the idle path R2 is realized by the idle-guide portion 15, through which the elongate push-pull member 6 is inserted, the structure of the frame 9 is simplified. In particular, in the case where the frame 9 is made of a resin mold part, it is possible to suppress the sliding noise which is generated when the elongate push-pull member 6 moves in the idle-guide portion 15.

Further, in the case where the idle-guide portion 15 in its entire length is connected to the motor-fixture portion 13 through the connection portion 29, it is possible to suppress deflection of the idle-guide portion 15 which is an elongate part. In addition, the formation of the frame 9 as a resin mold part facilitates formation of the bearing portion 17, which has a circular concave shape. Since the tip end of the output shaft 4A of the drive motor 4 is rotatably supported by the above bearing portion 17, inclination of the drive gear 5, which is axially coupled to the output shaft 4A, is prevented, so that the rack teeth 10A of the rack belt 10 precisely mesh with the drive gear 5.

A preferred embodiment according to the present invention has been explained above. Although the elongate push-pull member 6 in the embodiment explained above is the rack belt 10, alternatively, the elongate push-pull member 6 may be a geared wire which has a spiral groove being formed on the outer peripheral surface and meshing with the drive gear 5. Further, open-ended belts other than the rack belt 10 can also be used as the elongate push-pull member 6. For example, in the case where the drive gear 5 is a toothed pulley, a timing belt having tooth grooves or tooth holes is used as the elongate push-pull member 6.

Figure 12A:
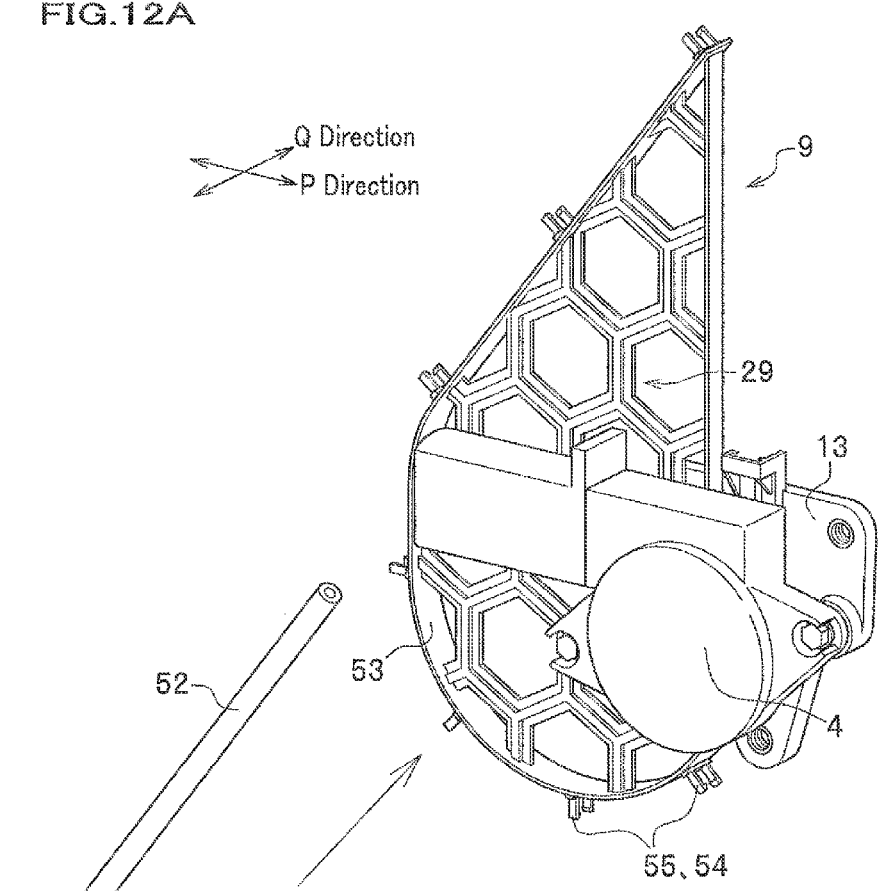
FIG. 12A is a perspective exterior view illustrating a means for holding an orbit of a geared wire in the idle path where the elongate push-pull member is composed of the geared wire.
Figure 12B:
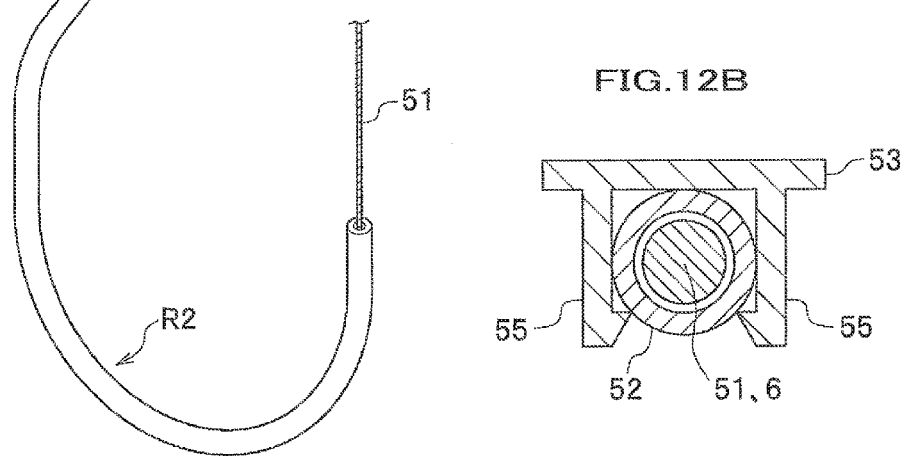
FIG. 12B is a cross-sectional view illustrating a means for holding an orbit of a geared wire in the idle path in the case where the elongate push-pull member is the geared wire.

FIGS. 12A and 12B are explanatory diagrams illustrating an example of "the means for holding the orbit of the elongate push-pull member 6 in the idle path R2" in the case where the elongate push-pull member 6 is a geared wire 51. FIG. 12A is a perspective view illustrating the appearance of the example, and FIG. 12B is a cross-sectional view of the example. The geared wire 51 is covered by a protection pipe 52 in the idle path R2. The protection pipe 52 is, for example, a resin pipe or a metal pipe. A mounting frame 53 is formed in the frame 9 along the orbit of the elongate push-pull member 6 in the idle path R2, and multiple protection-pipe fixtures 54 are formed in the mounting frame 53 along the orbit. The protection pipe 52, approximately in its entire length, is fixed to the mounting frame 53 with the protection-pipe fixtures 54, where an end of the protection pipe 52 is inserted into and fixed to the lower portion of the motor-fixture portion 13. Each of the protection-pipe fixtures 54 is realized by, for example, a pair of engagement claws 55 between which the protection pipe 52 is held. When the protection pipe 52 is pressed onto the mounting frame 53, the tip end portions of the claws are elastically deformed to allow passage of the protection pipe 52. Thereafter, when the tip end portions of the claws are elastically returned to the original positions, the protection-pipe fixtures 54 fix the protection pipe 52 to the mounting frame 53 by engagement of the protection pipe 52 with the protection-pipe fixtures 54. That is, the protection-pipe fixtures 54 have a function of positioning the protection pipe 52. Therefore, in the structure using the protection pipe 52, the protection-pipe fixtures 54 correspond to the means for holding the orbit of the elongate push-pull member 6 in the idle path R2. Of course, the protection-pipe fixtures 54 are also formed integrally with the frame 9.

The Second Embodiment

Figure 13:
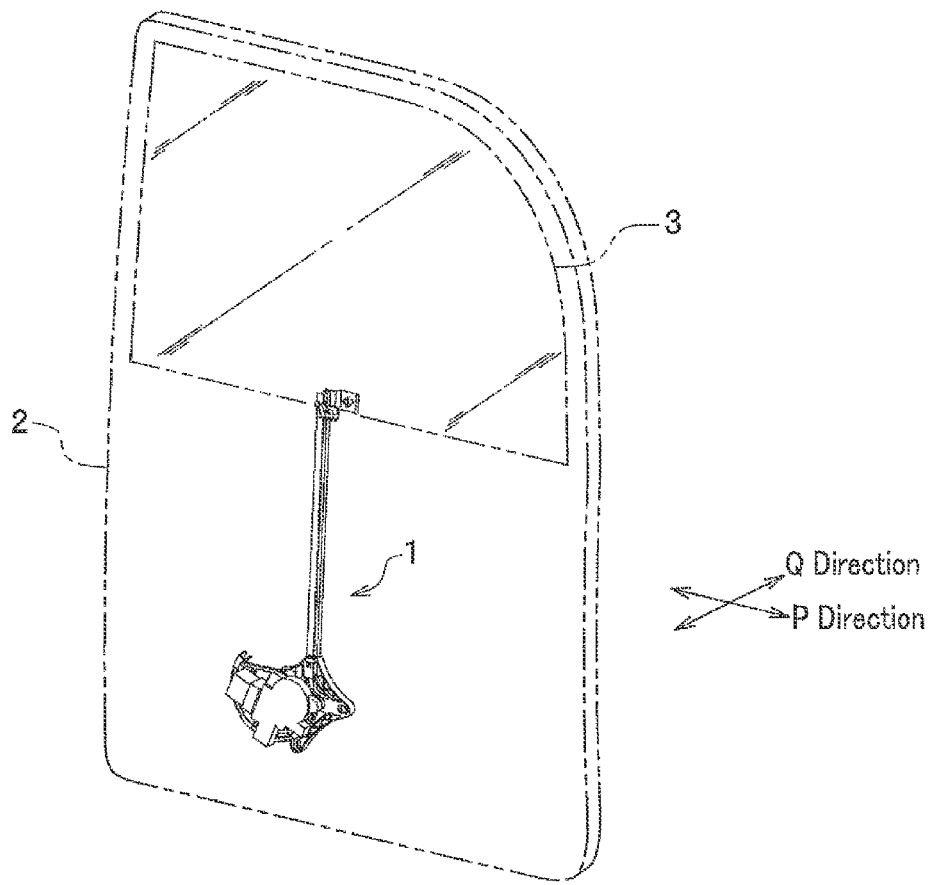
FIG. 13 is a perspective exterior view illustrating a second embodiment in which a window regulator according to the present invention is applied to a side door in an automobile.
Figure 14:
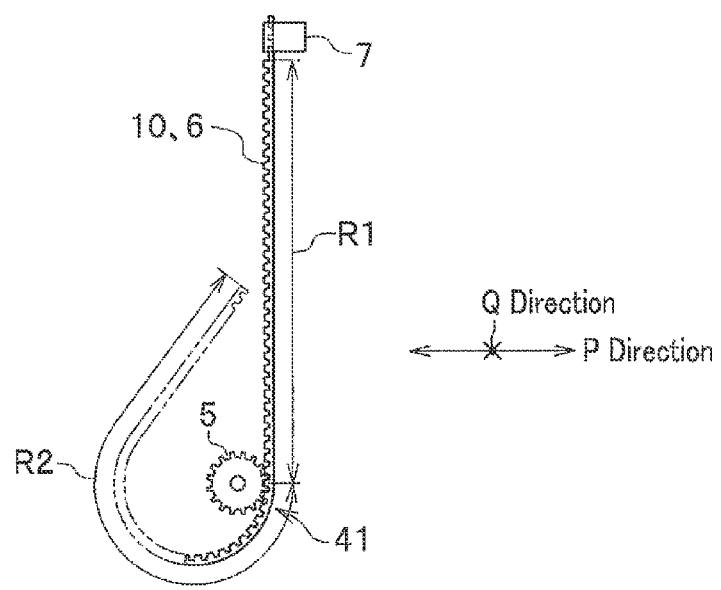
FIG. 14 is a schematic side view illustrating a drive path and an idle path of the elongate push-pull member in the second embodiment of the present invention.
Figure 15:
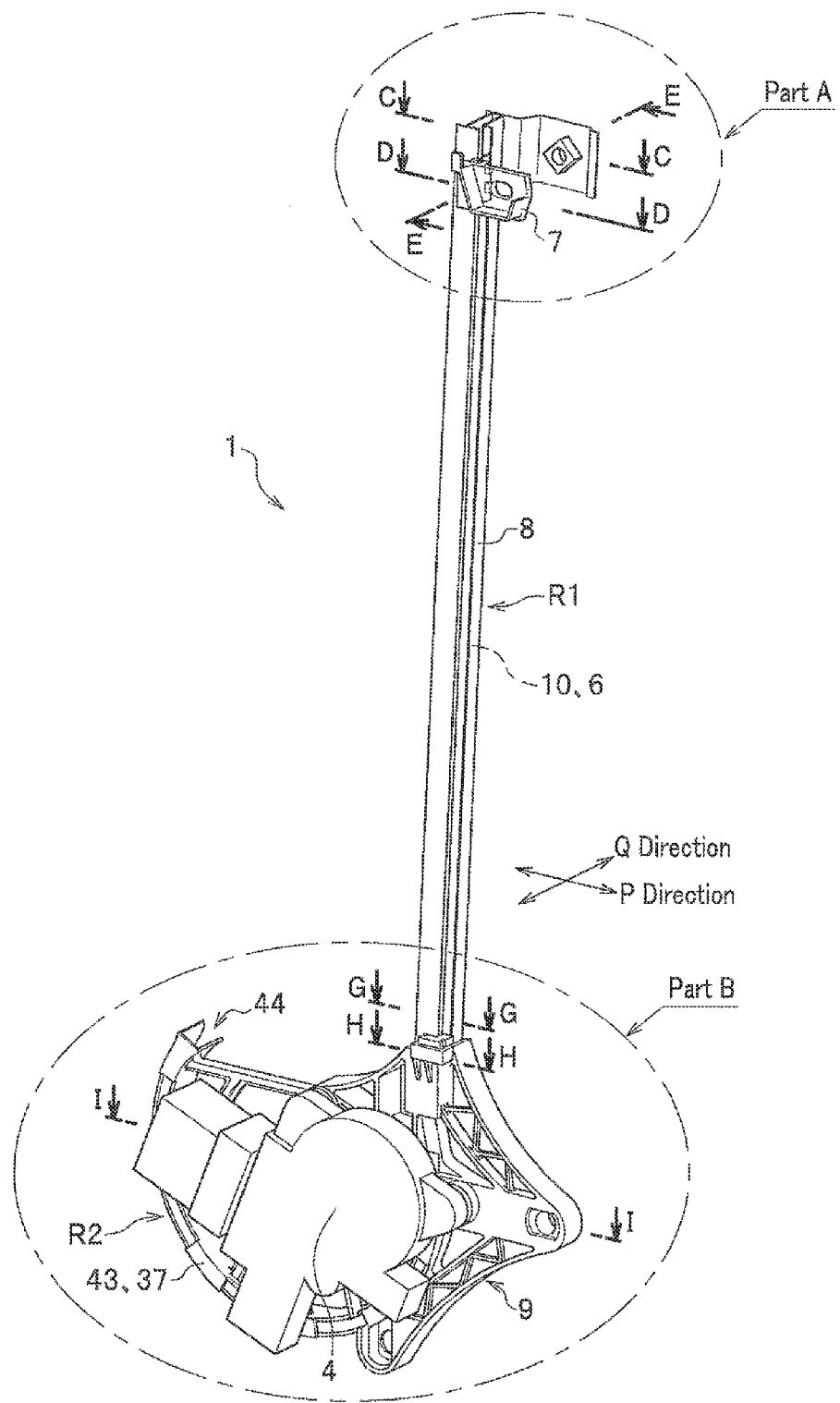
FIG. 15 is a perspective exterior view illustrating a window regulator according to the second embodiment of the present invention.

The second embodiment of the present invention is explained with reference to FIGS. 13 to 26, where the elements identical to the first embodiment respectively bear the reference numbers identical to the first embodiment, and part of the explanations on the identical elements is not repeated. As illustrated in FIG. 13, a window regulator 1, which moves up and down a pane of window glass 3, is built inside a lower portion of a side door 2 in an automobile. As illustrated in FIG. 15, the window regulator 1 is constituted mainly by a drive motor 4, a drive gear 5, an elongate push-pull member 6, a carrier 7, a guide rail 8, and a frame 9. The drive gear 5 (illustrated in FIG. 23) is axially coupled to the output shaft of the drive motor 4. The elongate push-pull member 6 is open ended, i.e., having one end and the other end, and flexible, meshes with the drive gear 5, and can be pushed and pulled by bidirectional rotations of the drive gear 5. The carrier 7 is connected with the one end of the elongate push-pull member 6 and is also connected with the window glass 3. The guide rail 8 guides the elongate push-pull member 6 and the carrier 7 in a drive path R1. A means for fixing and supporting the drive motor 4, a means for fixing and supporting the guide rail 8, a means for guiding a curved orbit of the elongate push-pull member 6 in the idle path R2, and a means for mounting the window regulator 1 on an object (the side door 2) are integrally formed in the frame 9.

<Elongate Push-Pull Member 6>

Figure 21:
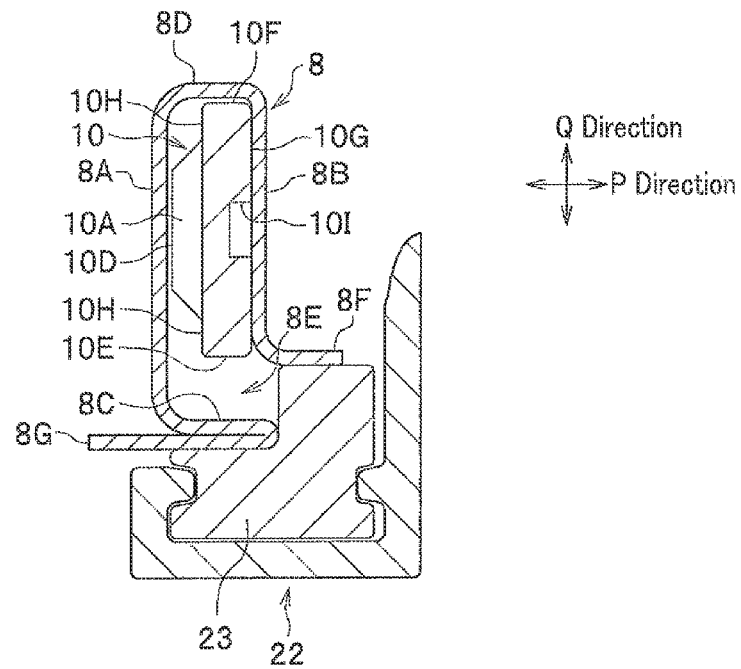
FIG. 21 is a cross-sectional view at the G-G cross section indicated in FIG. 15.

The elongate push-pull member 6 is explained below with reference to FIGS. 16 and 21. The elongate push-pull member 6 in the present embodiment is realized by a rack belt 10. The rack belt 10 has a rack-teeth surface 10D, first and second belt side surfaces 10E and 10F, and a belt back surface 10G, where the rack-teeth surface 10D corresponds to the upper surfaces of the rack teeth 10A. Therefore, the drive gear 5 (illustrated in FIG. 23) which meshes with the rack belt 10 is a pinion gear. As illustrated in FIG. 21, the rack teeth 10A is formed to have a width smaller than the entire width of the rack belt 10, so that step faces 10H are formed on both sides of the rack teeth 10A. In addition, a rectangular groove 10I is formed in the center in the width direction of the belt back surface 10G, along the direction in which the belt extends.

Figure 16:
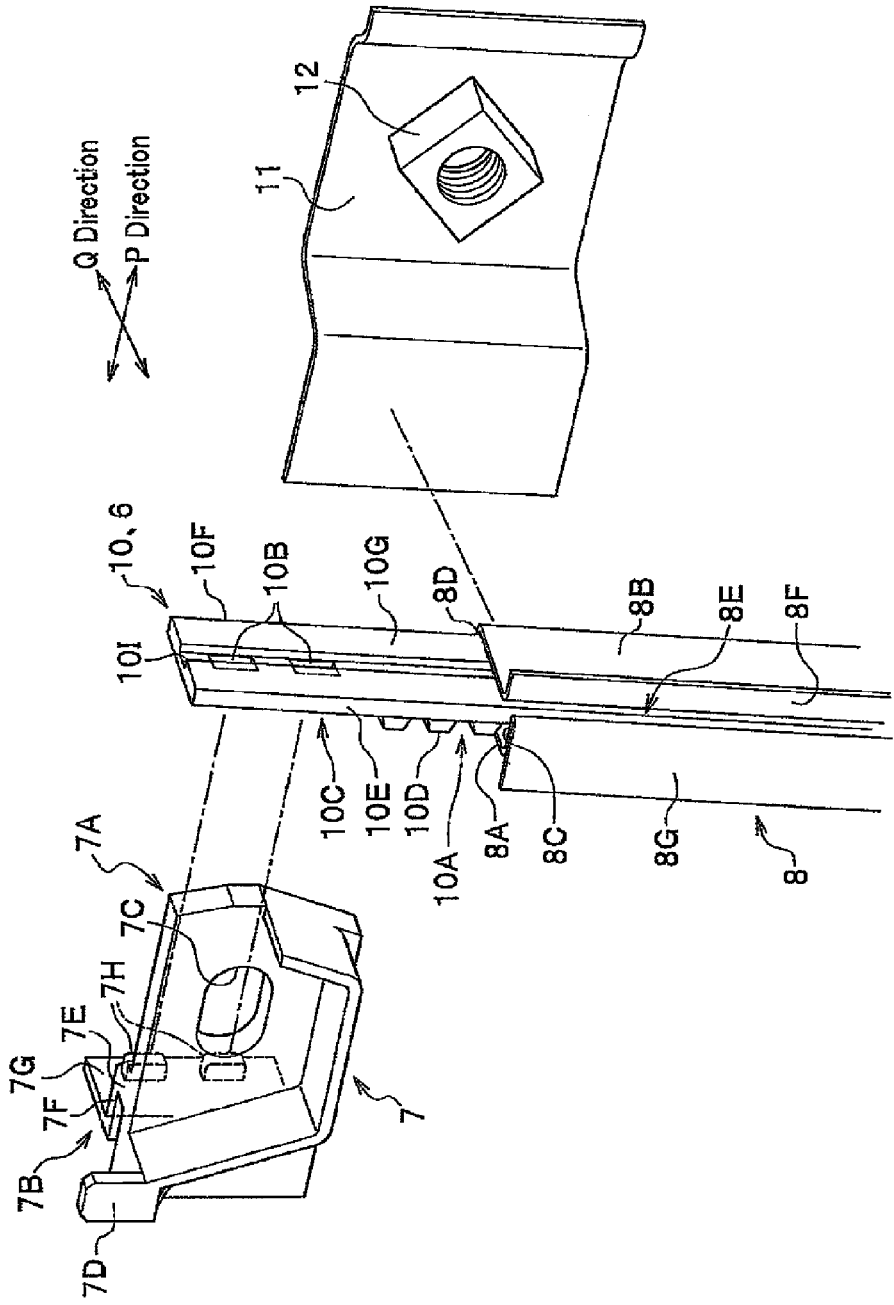
FIG. 16 is an exploded perspective view of the part A in FIG. 15.
Figures 20A, 20B:
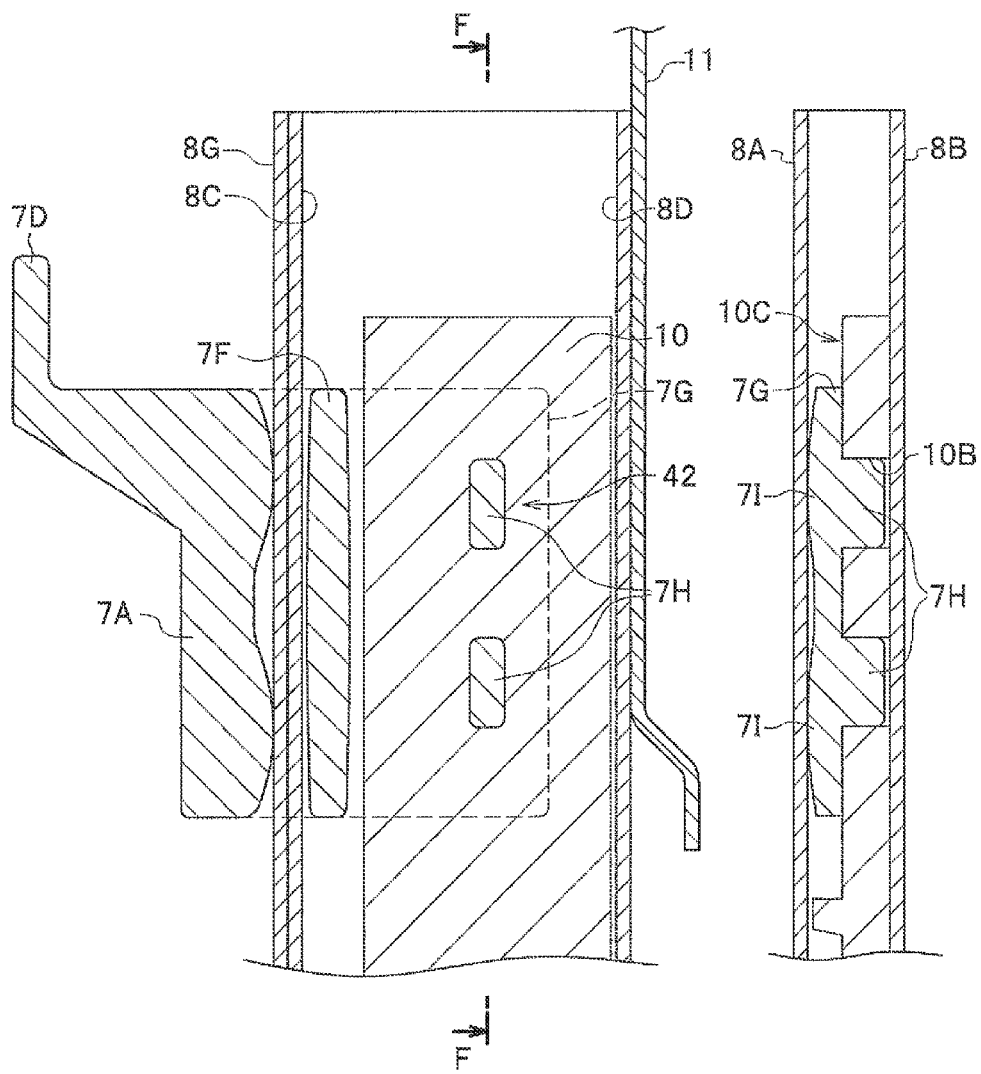
FIG. 20A is a cross-sectional view at the E-E cross section indicated in FIG. 15.
FIG. 20B is a cross-sectional view at the F-F cross section indicated in FIG. 20A.

As illustrated in FIGS. 16 and 20B, the rack teeth 10A are not formed on the rack-teeth surface 10D side in a vicinity of an end of the rack belt 10 so as to form a thin belt portion 10C of the rack belt 10. The thickness of the thin belt portion 10C is small compared with the thickness of the other portions of the rack belt 10 because of the absence of the rack teeth 10A. The thin belt portion 10C is perforated in such a manner that a pair of rectangular holes is formed as a pair of engagement holes 10B at upper and lower positions in the thin belt portion 10C. The engagement holes 10B face the bottom surface of the rectangular groove 10I. The above rack belt 10 is made of, for example, a synthetic resin, and is arranged in such a manner that the rack-teeth surface 10D faces the inner side of the curved orbit of the idle path R2.

<Carrier 7>

Figure 19:
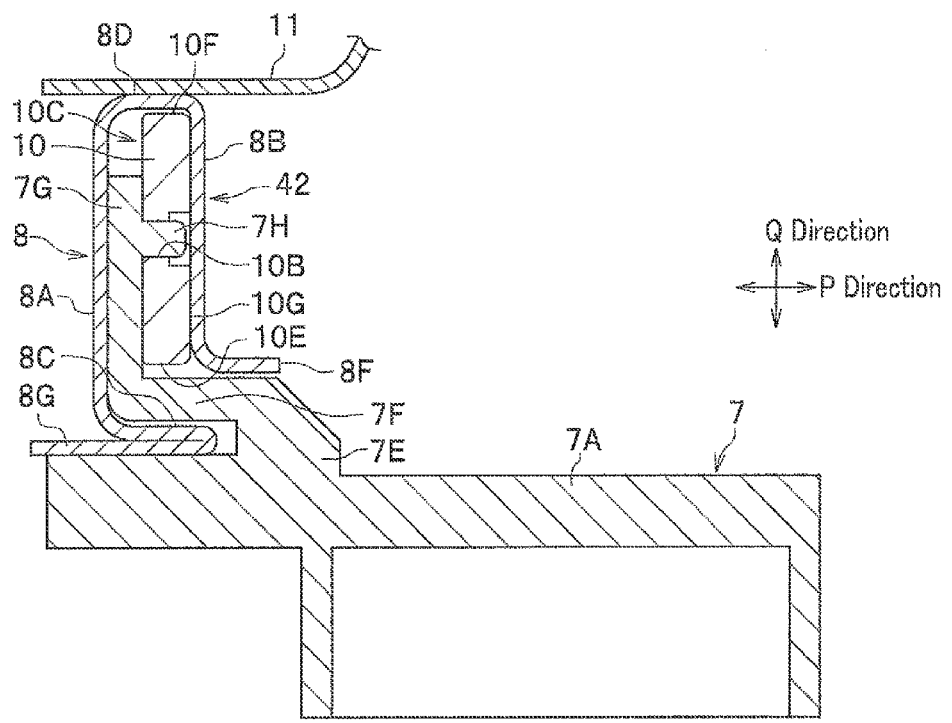
FIG. 19 is a cross-sectional view at the D-D cross section indicated in FIG. 15.

As mainly illustrated in FIGS. 16 and 19, the carrier 7 includes a glass connection part 7A and a belt connection part 7B, where the glass connection part 7A is formed to have a plate surface along the P direction and connected with a lower portion of the window glass 3 (illustrated in FIG. 13), and the belt connection part 7B is formed to protrude from a surface of the glass connection part 7A, and connected with one end of the rack belt 10. The glass connection part 7A has an approximately rectangular shape which laterally extends when viewed from the Q direction. In addition, a mounting hole 7C through which a bolt (not shown) for fixing the window glass 3 is to be inserted is formed in the glass connection part 7A. Further, a wall 7D for preventing falling down of the window glass 3 is arranged to protrude from another surface of the glass connection part 7A.

The belt connection part 7B has a shape of a crank in the plan view as illustrated in FIG. 19. The belt connection part 7B includes a base portion 7E, an intermediate portion 7F, and a slide portion 7G. The base portion 7E is formed to protrude from a surface of the glass connection part 7A in a direction perpendicular to the surface, the intermediate portion 7F is arranged to extend from the top of the base portion 7E in a direction parallel to the surface of the glass connection part 7A, and the slide portion 7G is arranged to extend from the tip end of the intermediate portion 7F in a direction away from the surface of the glass connection part 7A. In addition, a pair of engagement protrusions 7H each having the shape of a rectangular parallelepiped are formed at upper and lower positions on a surface of the slide portion 7G. In addition, elastic protrusions 7I (illustrated in FIG. 20B) each having an arc-like profile along the vertical direction are formed at the positions right behind the engagement protrusions 7H on another surface of the slide portion 7G.

When the thin slide portion 7G is placed over the thin belt portion 10C in the rack belt 10 so that the engagement protrusions 7H are respectively engaged with the engagement holes 10B, the belt connection part 7B is connected with the rack belt 10. The tip of the engaging projections 7H stays within the rectangular groove 10I. Therefore, the engagement portion 42 in which the rack belt 10 and the carrier 7 are engaged with each other is arranged inside the guide rail 8, and does not come out of the guide rail 8 unless the window regulator 1 is decomposed.

<Guide Rail 8>

The guide rail 8 is explained below with reference to FIGS. 16 and 18 to 21. The guide rail 8 in the second embodiment is similar to the guide rail 8 in the first embodiment. That is, the guide rail 8 is an elongate member having a fixed cross section, and being approximately vertically arranged. In view from the P direction, the guide rail 8 has a gently curved shape corresponding to a curved profile of the window glass 3. In contrast, in view from the Q direction, the guide rail 8 has a profile along a straight line. Further, the guide rail 8 includes a rectangular frame portion having a rectangular cross section elongated in the Q direction as illustrated in the plan view of FIG. 21 so as to guide four sides of the rack belt 10 (i.e., the rack-teeth surface 10D, the first belt side surface 10E, the second belt side surface 10F, and the belt back surface 10G). The rectangular frame portion is constituted by first to fourth frame face portions 8A, 8B, 8C, and 8D, where the first frame face portion 8A faces the rack-teeth surface 10D, the second frame face portion 8B faces the belt back surface 10G, the third frame face portion 8C faces the first belt side surface 10E, and the fourth frame face portion 8D faces the second belt side surface 10F. The inside space surrounded by the above rectangular frame portion realizes a guide groove for the rack belt 10.

<Frame 9>

The frame 9 is explained below with reference to FIGS. 17 and 21 to 23. The frame 9 includes a motor-fixture portion 13 for fixing and supporting the drive motor 4, a guide-rail fixture portion 14 for fixing and supporting the lower end of the guide rail 8, and a curved-orbit guide portion 37 for guiding the rack belt 10 through a curved orbit of the rack belt 10 in the idle path R2. For example, the frame 9 is a resin mold part in which the motor-fixture portion 13, the guide-rail fixture portion 14, and the curved-orbit guide portion 37 are integrally formed.

<Motor-Fixture Portion 13 (Means for Fixing and Supporting Drive Motor 4)>

Figure 17:
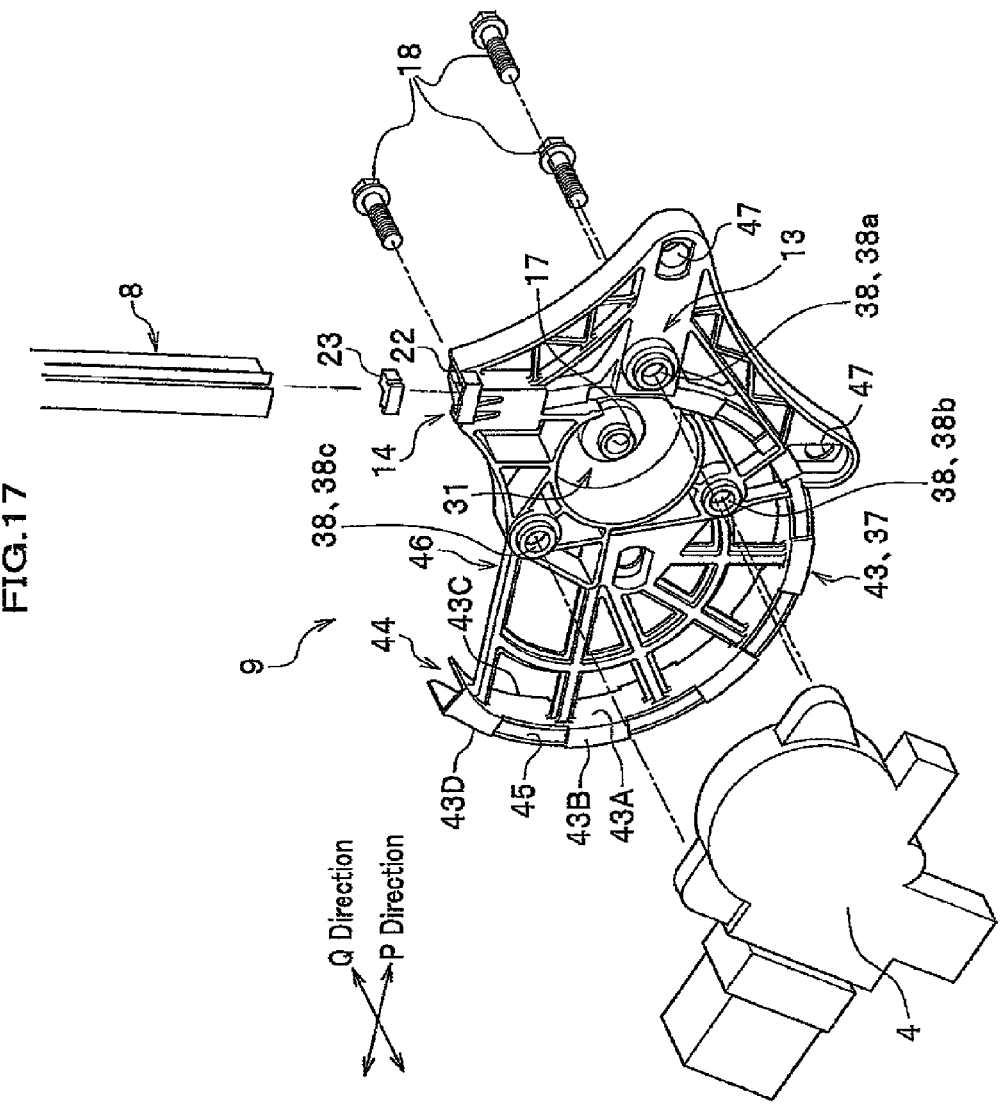
FIG. 17 is an exploded perspective view of the part B in FIG. 15.
Figure 18:
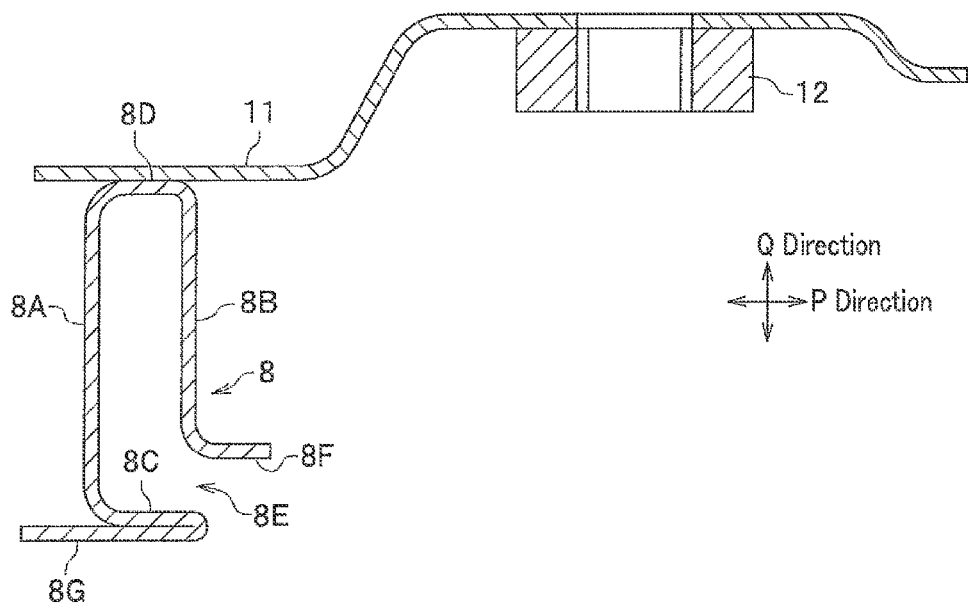
FIG. 18 is a cross-sectional view at the C-C cross section indicated in FIG. 15.
Figure 23A:
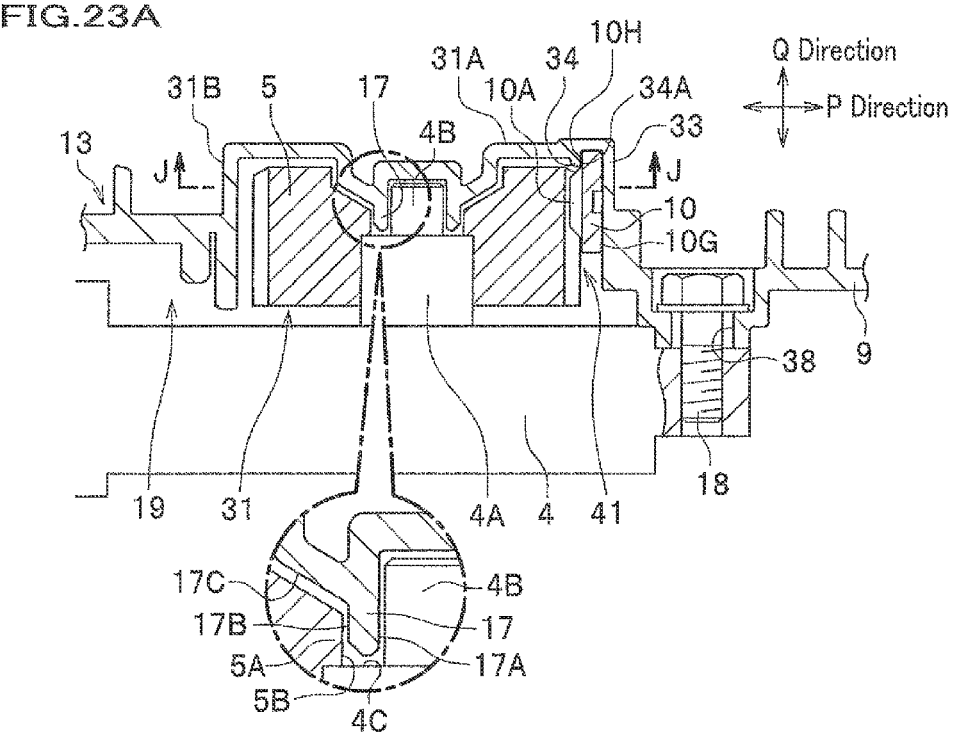
FIG. 23A is a cross-sectional view at the I-I cross section indicated in FIG. 15.

The motor-fixture portion 13 is formed as a platelike portion of the frame 9 which is arranged approximately along a plane perpendicular to the Q direction and has multiple protrusions and recesses as illustrated in FIGS. 17 and 23A. Multiple motor mounting holes 38 are formed in the motor-fixture portion 13 by perforation of the motor-fixture portion 13. In addition, a bearing portion 17 having a circular concave shape and rotatably supporting a tip end of the output shaft 4A of the drive motor 4 is formed in the motor-fixture portion 13.

Specifically, the bearing portion 17 is formed as an annular-wall portion protruding toward the drive motor 4. In addition, the tip end of the output shaft 4A is formed to be a small-diameter portion 4B, and an inner surface 17A of the bearing portion 17 rotatably supports the small-diameter portion 4B. In addition, according to the present embodiment, the drive gear 5 is axially coupled to the output shaft 4A by spline coupling or the like in such a manner that the drive gear 5 cannot rotate relative to the drive motor 4 and can slide along the output shaft 4A in the axis direction. A protruded portion 5A is formed on an inner peripheral surface of the drive gear 5, and located between an annular step face 4C of the output shaft 4A and an inclined surface 17C formed on the periphery of the bearing portion 17. Therefore, movement of the drive gear 5 relative to the output shaft 4A in the axis direction is blocked. In addition, an outer peripheral surface 17B of the bearing portion 17 guides an inner peripheral surface 5B of the protruded portion 5A, to have the function of positioning of the drive gear 5 in the radial direction. Although the gap between the inner surface 17A of the bearing portion 17 and the outer peripheral surface of the small-diameter portion 4B and the gap between the outer peripheral surface 17B of the bearing portion 17 and the inner peripheral surface 5B of the drive gear 5 are exaggerated in the illustration in FIG. 23A, the actual gaps are very small.

When the drive motor 4 is fixed to the motor-fixture portion 13, a space around the drive gear 5 becomes an enclosed space 19, which is enclosed by the chassis of the drive motor 4 and a molded surface of the motor-fixture portion 13 as illustrated in FIG. 23A. The enclosed space 19 is formed for the purpose of water tightness, dust tightness, and the like. In addition, in order to further enhance the water tightness, dust tightness, and the like of the enclosed space 19 for the drive gear 5, the drive gear 5 is laid out in a gear-housing space 31 formed in the motor-fixture portion 13. The gear-housing space 31 is formed, along a plane perpendicular to the Q direction, with a base-plate portion 31A and an annular-wall portion 31B. The base-plate portion 31A has an approximately disklike shape with a diameter greater than the diameter of the drive gear 5. The annular-wall portion 31B rises from the base-plate portion 31A toward the drive motor 4 along the Q direction and is annularly formed around the shaft center of the drive gear 5 with a fixed diameter so as to surround the teeth surfaces of the drive gear 5 made of a spur gear. The aforementioned bearing portion 17 is formed in the center of the base-plate portion 31A.

Figure 23B:
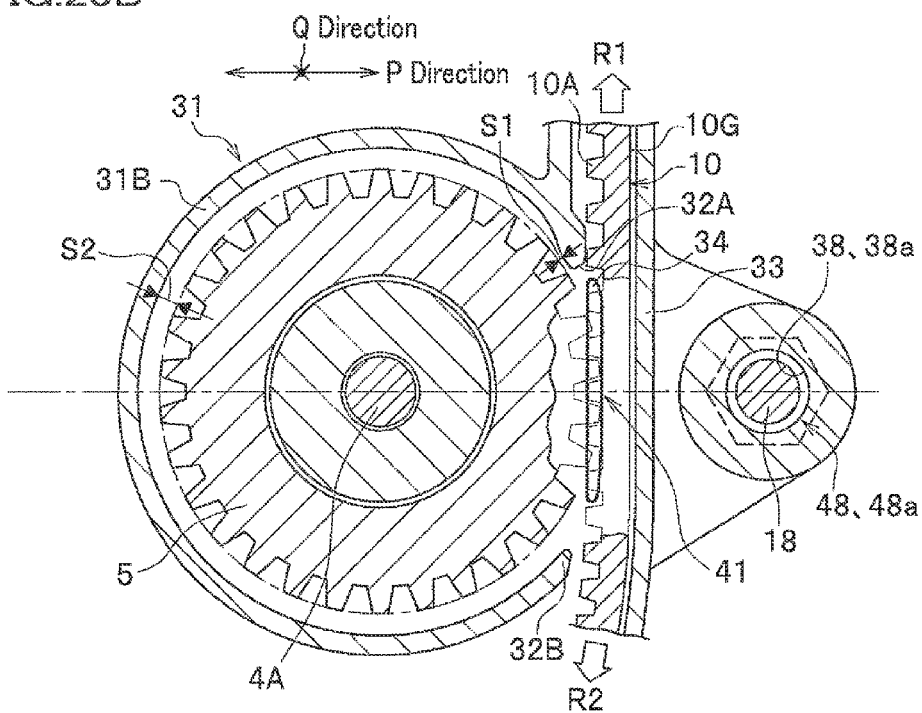
FIG. 23B is a cross-sectional view at the J-J cross section indicated in FIG. 23A.

As illustrated in FIG. 23B, an opening is formed in a portion of the annular-wall portion 31B, so that a portion of the drive gear 5 is exposed from the opening in the annular-wall portion 31B and meshes with the rack belt 10. At least, a wall edge 32A, relatively near to the drive path R1, of the both wall edges (32A and 32B) on the opening in the annular-wall portion 31B is formed to protrude toward the shaft center of the drive gear 5. That is, only the wall edge 32A is formed to protrude toward the shaft center of the drive gear 5 from the annular-wall portion 31B, which is centered at the shaft center of the drive gear 5 and has a fixed diameter. Therefore, the gap S1 between the wall edge 32A and the teeth surface of the drive gear 5 is set smaller than the gap S2 between the inner peripheral surface of the annular-wall portion 31B and the teeth surface of the drive gear 5. In some cases, the other wall edge 32B of the annular-wall portion 31B on the idle path R2 side of the opening in the annular-wall portion 31B may also be formed to protrude toward the shaft center of the drive gear 5, i.e., the gap between the wall edge 32B and the teeth surface of the drive gear 5 becomes smaller than the gap S2 between the inner peripheral surface of the annular-wall portion 31B and the teeth surface of the drive gear 5.

The reason why the gap S1 between the wall edge 32A and the teeth surface of the drive gear 5 is set smaller than the gap S2 between the inner peripheral surface of the annular-wall portion 31B and the teeth surface of the drive gear 5 is explained below. If the gap S1 is set equal to the gap S2, the rack belt 10 can be caught into the gap between the wall edge 32A and the drive gear 5. Since no great burden is imposed on the portion of the rack belt 10 which is located on the idle path R2 side of the meshing portion 41, almost no excessive bending deformation is likely to occur in the portion of the rack belt 10 located on the idle path R2 side. Therefore, there is almost no possibility that the rack belt 10 is caught into the gap between the drive gear 5 and the wall edge 32B located on the idle path R2 side. On the other hand, since the load caused by ascent and descent of the window glass 3 is imposed on the portion of the rack belt 10 located on the drive path R1 side, excessive bending deformation can occur in the portion of the rack belt 10 located on the drive path R1 side. Therefore, the portion of the rack belt 10 located on the drive path R1 side can be caught into the gap between the drive gear 5 and the wall edge 32A.

In order to overcome the above problem, for example, a technique of making the aforementioned gap S2 small while equalizing the inner diameter of the entire annular-wall portion 31B including the wall edges 32A and 32B may come to mind. However, since the gap S2 to the annular-wall portion 31B is set small in approximately the entire circumference of the drive gear 5 according to the above technique, it is difficult to control the quality of the gap S2 in consideration of the manufacturing error of the motor-fixture portion 13 and the fabrication error of the drive gear 5. On the other hand, in the case where the gap S2 is set to be a sufficiently large value, and only the gap S1 to the wall edge 32A (and the gap to the wall edge 32B in some cases) is set smaller than the gap S2, the target of the quality control can be limited to only one point (or two points in the case where the gap S1 to the wall edge 32B is also set small).

Next, in the meshing portion 41 between the drive gear 5 and the rack belt 10, the belt back surface 10G of the rack belt 10 is guided by a meshing-portion guide wall 33, which is linearly formed along the vertical direction in the motor-fixture portion 13. In addition, as illustrated in FIG. 23A, a meshing-portion guide protrusion 34 is formed on the base-plate portion 31A in parallel with the meshing-portion guide wall 33. The meshing-portion guide protrusion 34 is formed to extend from a vicinity of the wall edge 32A to a vicinity of the wall edge 32B, for example, as illustrated in FIG. 23B, and guides the step faces 10H of the rack belt 10 along a planar guide face 34A of the meshing-portion guide protrusion 34 as illustrated in FIG. 23A. Thus, the rack belt 10 is guided by the meshing-portion guide wall 33 and the meshing-portion guide protrusion 34, so that deflection of the rack belt 10 in the belt thickness direction is suppressed and the depth of the mesh between the drive gear 5 and the rack teeth 10A is maintained constant.

<Connection Portion 48>

Figure 26:
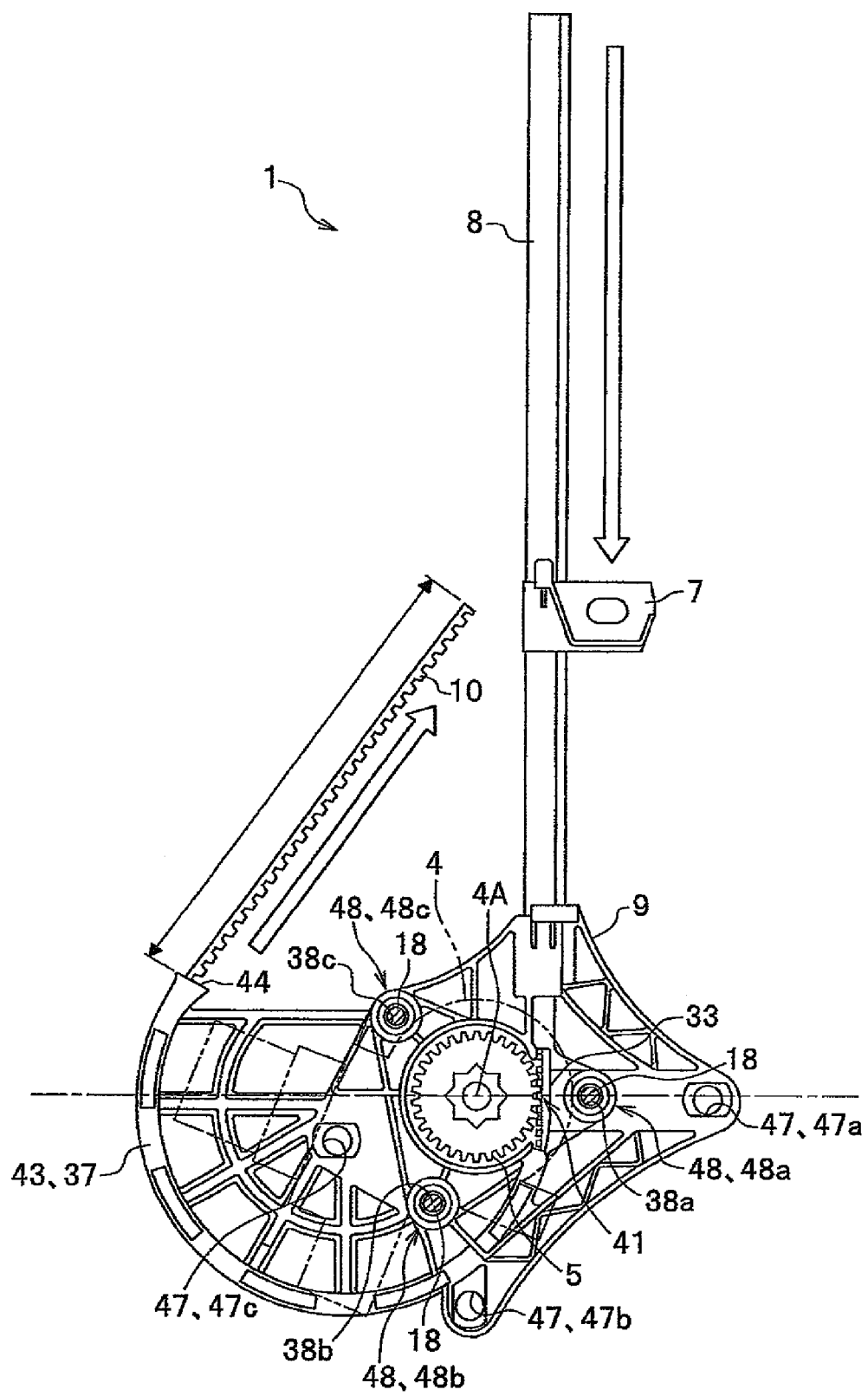
FIG. 26 is a side view of the window regulator according to the second embodiment of the present invention in the state in which a rack belt protrudes out of the tail-end opening of the rectangular-pipe member.

As illustrated in FIG. 17, according to the present embodiment, the motor mounting holes 38 are arranged at three positions (38a, 38b, and 38c) in the frame 9 so as to surround the gear-housing space 31. The connection portions 48 (48a, 48b, and 48c) are realized at the three positions as illustrated in FIG. 26 by respectively inserting the bolts 18 through the motor mounting holes 38 and fastening the drive motor 4 to the frame 9. The connection portions 48 specifically mean connection points of the drive motor 4 with the frame 9 in the aforementioned means for fixing and supporting the drive motor 4.

Among others, the connection portion 48a is formed in the vicinity of the meshing portion 41 between the drive gear 5 and the rack belt 10, on the side opposite to the drive gear 5 with respect to the meshing-portion guide wall 33. Specifically, the connection portion 48a is formed in a vicinity of the meshing-portion guide wall 33 on an extension of a line connecting the output shaft 4A and the meshing portion 41 as illustrated in FIG. 23B.

When the drive gear 5 rotates, the rack belt 10 and the meshing-portion guide wall 33 receive a force in the direction away from the drive gear 5 (the direction to the right in FIG. 23B) at all times. Therefore, there is a possibility that the meshing-portion guide wall 33 is inclined by the above force, so that the rack belt 10 can become apart from the drive gear 5 and idling of the drive gear 5 can occur. In particular, the greatest force is applied to the part of the meshing-portion guide wall 33 which is located on the extension of the line connecting the output shaft 4A and the meshing portion 41.

However, it is possible to reinforce the meshing-portion guide wall 33 and prevent inclination of the meshing-portion guide wall 33 by arranging the connection portion 48a at a position on the extension of the line connecting the output shaft 4A and the meshing portion 41 in the vicinity of the meshing portion 41 on the side opposite to the drive gear 5 with respect to the meshing-portion guide wall 33. Therefore, the rack belt 10 can be suitably guided, so that idling of the drive gear 5 can be prevented. In addition, the provision of the connection portion 48a enables reduction in the thickness of the meshing-portion guide wall 33 and achievement of both of the fastening of the drive motor 4 to the frame 9 and the reinforcement of the meshing-portion guide wall 33.

Although the connection portion 48a is positioned as explained above according to the present embodiment, the position of the connection portion 48a is not limited to the position explained above. It is sufficient for the connection portion 48a to be located in a vicinity of the meshing portion 41 on the side opposite to the drive gear 5 with respect to the meshing-portion guide wall 33. For example, the condition "the connection portion is formed on the extension of the line connecting the output shaft and the meshing portion" includes the case in which part of the head of one of the bolts 18 is located on the extension of the line connecting the output shaft and the meshing portion.

<Guide-Rail Fixture Portion 14 (Means for Fixing and Supporting Guide Rail 8)>

Figure 22:
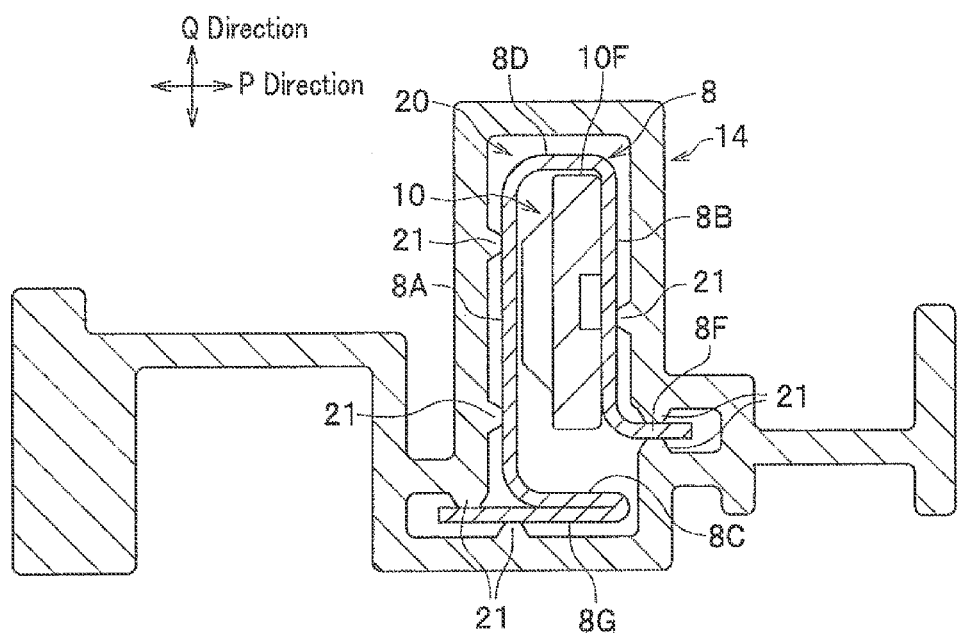
FIG. 22 is a cross-sectional view at the H-H cross section indicated in FIG. 15.

As in the first embodiment, the guide-rail fixture portion 14 as illustrated in FIG. 17 is located on the upper portion of the motor-fixture portion 13, and is formed to have an opening 20 as illustrated in FIG. 22. The opening 20 is a vertical through hole through which the bottom end portion of the guide rail 8 can be inserted for fixing as illustrated in FIG. 22.

<Curved-Orbit Guide Portion 37 (Means for Guiding Elongate Push-Pull Member 6 in Curved Orbit in Idle Path R2)>

In the example of FIG. 17, the curved-orbit guide portion 37 is constituted by a rectangular-pipe member 43 having a rectangular cross-section the long side of which is in the Q direction. The rectangular-pipe member 43 has an inner-peripheral guide wall 43A, a first side guide wall 43B, a second side guide wall 43C, and an outer-peripheral guide wall 43D respectively for guiding the rack-teeth surface 10D, the first belt side surface 10E, the second belt side surface 10F, and the belt back surface 10G of the rack belt 10 (illustrated in FIG. 21) when the rack belt 10 is inserted through the curved-orbit guide portion 37. The curved-orbit guide portion 37 is formed to be curved along a curve which is convex down and has an approximately constant radius of curvature. The curved-orbit guide portion 37 has a tip end which faces the enclosed space 19 (illustrated in FIG. 23A), and extends from the bottom of the motor-fixture portion 13 to a tail-end opening 44, which faces to an upward direction inclined to the drive path R1 side from the vertical direction. The tail-end opening 44 is located above the meshing portion 41 between the drive gear 5 and the rack belt 10. Perforations 45 for the purpose of weight reduction and the like are formed at appropriate intervals along the direction in which the curved-orbit guide portion 37 extends, in each of the first side guide wall 43B and the second side guide wall 43C. The rectangular-pipe member 43 is connected with the motor-fixture portion 13 through a connection portion 46. When the window glass 3 (illustrated in FIG. 13) is opened to a predetermined degree, i.e., when the carrier 7 moves down to a predetermined position, the other end of the rack belt 10 protrudes out of the tail-end opening 44.

As illustrated in FIGS. 24A and B, a protrusion 35 for pressing on the first belt side surface 10E is formed inside the first side guide wall 43B in the vicinity of the tail-end opening 44. Specifically, as illustrated in FIG. 24A, the protrusion 35 is formed to have a gentle arc-like shape along the direction in which the rectangular-pipe member 43 extends. The maximum dimension L of the protrusion 35 from the inner surface of the first side guide wall 43B is, for example, approximately 1 mm. When the rack belt 10 protrudes from the tail-end opening 44, the rack belt 10 is pressed by the protrusion 35 formed in the vicinity of the tail-end opening 44. Therefore, it is possible to prevent deflection of the protruding portion of the rack belt 10 in the belt width direction, i.e., in the Q direction.

However, when the first belt side surface 10E is pressed by the protrusion 35 and therefore the second belt side surface 10F is pressed on the second side guide wall 43C, the sliding friction of the rack belt 10 increases. In order to overcome the above problem, for example, one of the perforations 45 in the second side guide wall 43C opposed to the protrusion 35 may be formed to extend to the tail-end opening 44 as illustrated in FIG. 24A. In this case, the rack belt 10 pressed by the protrusion 35 is displaced to escape into the above perforation 45 extending to the tail-end opening 44, so that the sliding friction does not increase. Further, when the rack belt 10 is pressed by the protrusion 35, the rack belt 10 is elastically deformed and the first belt side surface 10E is pressed on the protrusion 35 by the restoring force associated with the elastic deformation. Therefore, even when the second belt side surface 10F is not pressed on the second side guide wall 43C, the deflection of the rack belt 10 in the width direction can be suppressed. Alternatively, it is possible to arrange the protrusion 35 on the second side guide wall 43C. Further alternatively, it is possible to arrange the protrusion 35 in the second side guide wall 43C and form one of the perforations 45 in the first side guide wall 43B opposed to the protrusion 35 to extend to the tail-end opening 44 such that the pressed rack belt 10 can be displaced to escape in the width direction.

In addition, both of the inner-peripheral guide wall 43A and the outer-peripheral guide wall 43D are formed to broaden the curved-orbit guide portion 37 toward the tail-end opening 44 as illustrated in FIG. 25. In order to guide the rack belt 10 to the close vicinity of the tail-end opening 44 while preventing the rack teeth 10A from being caught by the inner-peripheral guide wall at the tail-end opening 44, a gap between the rack belt 10 and the inner-peripheral guide wall 43A is set greater than a gap between the rack belt 10 and the outer-peripheral guide wall 43D at the tail-end opening 44, and a distance to the tail-end opening 44 from a position at which the broadening of the curved-orbit guide portion begins in the inner-peripheral guide wall 43A is set greater than a distance to the tail-end opening 44 from a position at which the broadening of the curved-orbit guide portion begins in the outer-peripheral guide wall 43D. That is, in order to guide the rack belt 10 to the close vicinity of the tail-end opening 44 while preventing the rack teeth 10A from being caught by the inner-peripheral guide wall 43A at the tail-end opening 44, the gap T1 between the rack belt 10 and the inner-peripheral guide wall 43A is set greater than the gap T2 between the rack belt 10 and the outer-peripheral guide wall 43D at the tail-end opening 44, and the distance U1 to the tail-end opening 44 from the position 36A at which the broadening of the curved-orbit guide portion 37 begins in the inner-peripheral guide wall 43A is set greater than the distance U2 to the tail-end opening 44 from the position 36B at which the broadening of the curved-orbit guide portion 37 begins in the outer-peripheral guide wall 43D as illustrated in FIG. 25.

<Mounting Hole 47 (Means for Mounting on Object)>

As illustrated in FIG. 17, multiple mounting holes 47 are formed around the motor-fixture portion 13 in the frame 9 as a means for mounting on an object (for example, the side door 2) on which the window regulator 1 is to be mounted. The lower portion of the window regulator 1 is fixed to the side door 2 (FIG. 13) by screwing bolts through the mounting holes 47 in the frame 9, and the upper portion of the window regulator 1 is fixed to the side door 2 by screwing the bolt through the fixture bracket 11 (FIG. 16) as described before. As illustrated in FIG. 26, the multiple mounting holes 47 (47a, 47b, and 47c) are arranged at three positions. Among others, the mounting hole 48a is formed on an extension of a line connecting the output shaft 4A of the drive motor 4 and the meshing portion 41 between the drive gear 5 and the rack belt 10.

<Operations>

When the drive motor 4 is driven, the rack belt 10 meshing with the drive gear 5 moves in the drive path R1 straightly in view from the Q direction, and the carrier 7, which is engaged with the top end of the rack belt 10 through the engagement protrusions 7H and the engagement holes 10B, moves up and down while being guided by the guide rail 8, so that the window glass 3 moves up and down. The position of the carrier 7 in the P direction relative to the guide rail 8 is determined when the back surface of the thin belt portion 10C of the rack belt 10 is in contact with the second frame face portion 8B and the elastic protrusions 7I which is protruding from the thin plate portion 7G1 is in contact with the first frame face portion 8A. In addition, the position of the carrier 7 in the Q direction relative to the guide rail 8 is determined when the third frame face portion 8C and the second flange face portion 8G are held between the intermediate portion 7F and one surface of the glass connection part 7A. In the above positions determined in the P and Q directions, the carrier 7 slides along the guide rail 8. The first flange face portion 8F prevents inclination of the carrier 7.

As illustrated in FIG. 21, the rack belt 10, which moves through the guide rail 8, is laid out in such a manner that the surface of the rack belt 10 on which the rack teeth 10A are formed faces the first frame face portion 8A, which is on the side opposite to the opening 8E. Therefore, even dust or water enters the guide rail 8 from the opening 8E, it is possible to suppress entry of dust or water into the rack teeth 10A side, and prevent intrusion of the dust into the meshing portion 41.

In addition, as illustrated in FIG. 23B, in the meshing portion 41, the gap S1 between the wall edge 32A and the teeth surface of the drive gear 5 is set smaller than the gap S2 between the inner peripheral surface of the annular-wall portion 31B and the teeth surface of the drive gear 5. Therefore, the rack belt 10 is not caught into the gap between the wall edge 32A and the drive gear 5. Further, since the rack belt 10 is guided by the meshing-portion guide wall 33 and the meshing-portion guide protrusion 34, deflection of the rack belt 10 in the belt thickness direction is suppressed, and the depth of the mesh between the drive gear 5 and the rack teeth 10A is maintained constant.

Incidentally, if the window regulator has a structure which is fabricated by mounting on the frame 9 the output shaft 4A of the drive motor 4 to which the drive gear 5 is rigidly fixed in advance, it is necessary to strictly control the precision in the fixing of the drive gear 5 to the drive motor 4 in order to achieve required precision in meshing between the rack teeth 10A and the drive gear 5. On the other hand, according to the present embodiment, the drive gear 5 is axially coupled to the output shaft 4A in such a manner that the drive gear 5 cannot rotate relative to the output shaft 4A and can slide along the axial direction, for example, by using the spline coupling. In this case, it is possible to precisely and easily determine the relative positions between the three parts as the drive gear 5, the drive motor 4, and the rack belt 10, and precisely control the meshing between the drive gear 5 and the rack teeth 10A, by using a structure in which the output shaft 4A of the drive motor 4 is rotatably supported by the bearing portion 17 and the inner peripheral surface 5B of the drive gear 5 is positioned and guided by the outer peripheral surface 17B of the bearing portion 17.

The portion of the rack belt 10 which is not used when the carrier 7 is moved down is turned up by the rectangular-pipe member 43 so as to be retreated and housed. When the carrier 7 moves down to a predetermined position, the other end of the rack belt 10 approximately linearly protrudes out of the tail-end opening 44 toward the guide rail 8 as illustrated in FIG. 26. FIG. 26 illustrates the state in which the rack belt 10 maximumly protrudes out of the tail-end opening 44. Since the rack belt 10 is pressed by the protrusion 35 shown in FIG. 24 in the close vicinity of the tail-end opening 44, deflection of the protruded portion of the rack belt 10 in the width direction is suppressed. Further, as illustrated in FIG. 25, both of the inner-peripheral guide wall 43A and the outer-peripheral guide wall 43D are formed to broaden the curved-orbit guide portion 37 toward the tail-end opening 44, where the gap between the rack belt 10 and the inner-peripheral guide wall 43A is set greater than the gap between the rack belt 10 and the outer-peripheral guide wall 43D at the tail-end opening 44, and the distance to the tail-end opening 44 from the position 36A at which the broadening of the curved-orbit guide portion 37 begins in the inner-peripheral guide wall 43A is set greater than the distance to the tail-end opening 44 from the position 36B at which the broadening of the curved-orbit guide portion 37 begins in the outer-peripheral guide wall 43D. Therefore, the rack teeth 10A are prevented from being caught by the inner-peripheral guide wall 43A at the tail-end opening 44, and the rack belt 10 is guided by the outer-peripheral guide wall 43D to the close vicinity of the tail-end opening 44.

According to the present invention, in view from the Q direction, a portion of the idle path R2 for retreating the portion of the elongate push-pull member 6 which is currently not used, i.e., the portion of the elongate push-pull member 6 extending from the meshing portion 41 to the other end, is formed with the curved-orbit guide portion 37 to have the curved shape. Therefore, the elongate push-pull member 6, which is an elongate member, can be laid out in a limited space such as the side door 2 or the like. In addition, since the window regulator 1 is configured to let the other end of the elongate push-pull member 6 protrude out of the curved-orbit guide portion 37, it is possible to reduce the region in which the curved-orbit guide portion 37 is arranged, and make the curved-orbit guide portion 37 compact and lightweight.

The window regulator 1 can be configured such that the drive path R1 extends downward from the meshing portion 41 (for example, in the case where the window regulator 1 illustrated in FIG. 15 is arranged upside down). However, in such a case, the drive motor 4 is located on the upper side. Therefore, the center of gravity of the window regulator 1 is elevated, and it is necessary to configure the window regulator 1 in such a manner that no interference with the drive motor 4 occurs in the portion in which the carrier 7 is connected to the window glass 3.

On the other hand, in the case where the drive path R1 is arranged to be directed upward from the meshing portion 41 as in the present embodiment, the drive motor 4 is located in the lower portion of the window regulator 1, and the structure for connecting the carrier 7 to the window glass 3 can be simplified. Therefore, the center of gravity of the window regulator 1 is lowered, so that the window regulator 1 according to the present embodiment is preferable for application to the side door 2, in which the center of gravity is required to be lowered. Further, since the curved-orbit guide portion 37 is formed to be convex down and extend to the position at which the tail-end opening 44 faces to an upward direction inclined to the drive path R1 side from the vertical direction. Therefore, the elongate push-pull member 6 can be turned up, retreated, and housed in a further compact arrangement. Furthermore, since the drive path R1 is linearly formed, the portion of the elongate push-pull member 6 which is located in the drive path R1 does not include a curved portion. Therefore, no bending stress occurs in the drive path R1, so that force transmission loss caused by the elongate push-pull member 6 is reduced, and the torque of the drive motor 4 is efficiently converted to the linear motive force and is then transmitted.

The preferable embodiments of the present invention have been explained above. Although the elongate push-pull member 6 is the rack belt 10 in the above embodiments, another example of the elongate push-pull member 6 is a geared wire which has a spiral groove being formed on the outer peripheral surface and meshing with the drive gear 5. Further, open-ended belts other than the rack belt 10 can also be used as the elongate push-pull member 6. For example, in the case where the drive gear 5 is a toothed pulley, a timing belt having tooth grooves or tooth holes is used as the elongate push-pull member 6.

LIST OF REFERENCE SIGNS

1: Window Regulator
2: Side Door
3: Window Glass
4: Drive Motor
5: Drive Gear
6: Elongate Push-pull Member
7: Carrier
8: Guide Rail
9: Frame
10: Rack Belt (Elongate Push-pull Member)
10A: Rack Teeth
10D: Rack-Teeth Surface
10E: First Belt Side Surface
10F: Second Belt Side Surface
10G: Belt Back Face
10H: Step Face
13: Motor-fixture Portion
14: Guide-rail Fixture Portion
15: Idle-guide Portion
24: Curved Portion
31B: Annular-wall Portion
32A: Wall Edge (on the drive path side)
32B: Wall Edge (on the idle path side)
33: Meshing-portion Guide Wall
34: Meshing-portion Guide Protrusion
37: Curved-orbit Guide Portion
41: Meshing Portion
42: Engagement Portion
43: Rectangular-pipe Member
44: Tail-end Opening
48: Connection Portion
R1: Drive Path
R2: Idle Path

The invention claimed is:
1. A window regulator comprising,
a drive gear connected to a drive motor,
an elongate push-pull member, which is open ended, meshes with the drive gear and can be pushed and pulled by bidirectional rotations of the drive gear,
a carrier which is connected with one end of the elongate push-pull member and is connected with a window glass, and
a guide rail which guides the elongate push-pull member and the carrier in a drive path, wherein:
the drive path is a path through which the elongate push-pull member moves, the drive path extending upward from a meshing portion at which the drive gear meshes with the elongate push-pull member to a carrier mounting portion at which the carrier is connected with the elongate push-pull member, and an idle path is a path provided for retreating a portion of the elongate push-pull member which is not used when the carrier is moved down, the idle path having a curved orbit;
the window regulator further comprises a frame in which a means for fixing and supporting the drive motor, a means for fixing and supporting the guide rail, a means for holding an orbit of the elongate push-pull member in the idle path, and a means for mounting on an object are integrally formed;
the elongate push-pull member is constituted by a rack belt having a rack-teeth surface, a first belt side surface, a second belt side surface, and a belt back surface and being arranged in such a manner that the rack-teeth surface faces to an inner side of the curved orbit of the idle path;
the means for holding the elongate push-pull member in the idle path is constituted by an idle-guide portion through which the elongate push-pull member is inserted, the idle-guide portion is constituted by a curved-orbit guide portion which is formed in a curved shape, the curved-orbit guide portion is constituted by a rectangular-pipe member of a rectangular cross-sectional shape, having an inner-peripheral guide wall, a first side guide wall, a second side guide wall, and an outer-peripheral guide wall, which respectively guide the rack-teeth surface, the first belt side surface, the second belt side surface, and the belt back surface;
the inner-peripheral guide wall and the outer-peripheral guide wall are formed to broaden the curved-orbit guide portion in a vicinity of a tail-end opening of the curved-orbit guide portion; and
a gap between the rack belt and the inner-peripheral guide wall is set greater than a gap between the rack belt and the outer-peripheral guide wall at the tail-end opening, and a position at which broadening of the curved-orbit guide portion begins in the inner-peripheral guide wall is more distant from the tail-end opening than a position at which broadening of the curved-orbit guide portion begins in the outer-peripheral guide wall.

2. The window regulator according to claim 1, wherein the means for fixing and supporting the drive motor includes a motor-fixture portion, and
    an approximately entire length of the idle-guide portion is connected to the motor-fixture portion through a connection portion.

3. The window regulator according to claim 1, wherein a bearing portion which has a circular concave shape and rotatably supports a tip end of an output shaft of the drive motor is formed in the frame.

4. The window regulator according to claim 1, wherein the idle-guide portion is constituted by the curved-orbit guide portion which is formed in the curved shape, and
    arranged in such a manner that another end of the elongate push-pull member protrudes out of the curved-orbit guide portion on a tail-end side of the idle path.

5. The window regulator according to claim 4, wherein the drive path is formed to extend upward along a straight line from the meshing portion between the drive gear and the elongate push-pull member, and
    the curved-orbit guide portion is formed to be convex downward from the meshing portion and extend to a position at which the tail-end opening of the curved-orbit guide portion faces the guide rail in an upward inclined direction.

6. A window regulator comprising:
a drive gear connected to a drive motor;
an elongate push-pull member, which is open ended, meshes with the drive gear and can be pushed and pulled by bidirectional rotations of the drive gear;
a carrier which is connected with one end of the elongate push-pull member and is connected with a window glass; and
a guide rail which guides the elongate push-pull member and the carrier in a drive path, wherein:
the drive path is a path through which the elongate push-pull member moves, the drive path extending upward from a meshing portion at which the drive gear meshes with the elongate push-pull member to a carrier mounting portion at which the carrier is connected with the elongate push-pull member, and an idle path is a path provided for retreating a portion of the elongate push-pull member which is not used when the carrier is moved down, the idle path having a curved orbit;
the window regulator further comprises a frame in which a means for fixing and supporting the drive motor, a means for fixing and supporting the guide rail, a means for holding the elongate push-pull member in the idle path, and a means for mounting on an object are integrally formed;
the elongate push-pull member is constituted by a rack belt having a rack-teeth surface, a first belt side surface, a second belt side surface, and a belt back surface and being arranged in such a manner that the rack-teeth surface faces to an inner side of the curved orbit of the idle path;
the means for holding the elongate push-pull member in the idle path is constituted by an idle-guide portion through which the elongate push-pull member is inserted, the idle-guide portion is constituted by a curved-orbit guide portion which is formed in a curved shape, and the curved-orbit guide portion is constituted by a rectangular-pipe member of a rectangular cross-sectional shape, having an inner-peripheral guide wall, a first side guide wall, a second side guide wall, and an outer-peripheral guide wall, which respectively guide the rack-teeth surface, the first belt side surface, the second belt side surface, and the belt back surface; and
a protrusion, which presses the first belt side surface or the second belt side surface, is formed on an inner side of the first side guide wall or the second side guide wall in a vicinity of a tail-end opening of the rectangular-pipe member.

7. The window regulator according to claim 6, wherein an opening extending to the tail-end opening of the rectangular-pipe member is formed in the first side guide wall or the second side guide wall which is opposed to the protrusion in such a manner that the rack belt pressed by the protrusion is displaced to escape in a width direction.

8. The window regulator according to claim 1, wherein
the frame includes an annular-wall portion which is formed around a shaft center of the drive gear so as to surround a teeth surface of the drive gear,
an opening is formed in the annular-wall portion, and a portion of the drive gear is exposed from the opening of the annular-wall portion and meshes with the rack belt,
and a gap between the teeth surface of the drive gear and wall edges of the annular-wall portion relatively near the drive path and at the opening is smaller than a gap between the teeth surface of the drive gear and an inner peripheral surface of the annular-wall portion.

9. The window regulator according to claim 8, wherein a step face is formed on a side of rack teeth of the rack belt,
the frame includes a meshing-portion guide wall and a meshing-portion guide protrusion in a meshing portion between the drive gear and the elongate push-pull member, the meshing-portion guide wall guides the belt back surface of the rack belt, and the meshing-portion guide protrusion guides the step face.

10. The window regulator according to claim 8, wherein a bearing portion which has a circular concave shape and rotatably supports a tip end of an output shaft of the drive motor is formed in the frame,
the bearing portion is formed as an annular-wall portion protruding toward a side near the drive motor, and an outer peripheral surface of the bearing portion guides an inner peripheral surface of the drive gear so as to determine a position of the inner peripheral surface of the drive gear.

11. The window regulator according to claim 1, wherein the frame includes
a meshing-portion guide wall and a connection portion of the drive motor and the frame,
the meshing-portion guide wall is arranged on a side opposite to the drive gear with respect to the elongate push-pull member and guides movement of the elongate push-pull member, and
the connection portion is arranged in a vicinity of a meshing portion in which the elongate push-pull member is meshed with the drive gear, on a side opposite to the drive gear with respect to the meshing-portion guide wall.

12. The window regulator according to claim 11, wherein the connection portion is formed on an extension of a line connecting an output shaft of the drive motor and the meshing portion.

\* \* \* \* \*